United States Patent [19]
Akagi

[11] Patent Number: 5,350,642
[45] Date of Patent: Sep. 27, 1994

[54] SOLID-ELECTROLYTE FUEL CELL SYSTEM

[75] Inventor: Kosuke Akagi, Osaka, Japan

[73] Assignee: Osaka Gas Co., Ltd., Osaka, Japan

[21] Appl. No.: 57,501

[22] Filed: May 4, 1993

[30] Foreign Application Priority Data

May 8, 1992 [JP] Japan .................. 4-115629

[51] Int. Cl.$^5$ .................. H01M 8/04; H01M 8/12
[52] U.S. Cl. .................. 429/32; 429/38; 429/39
[58] Field of Search .................. 429/20, 32, 38, 39

[56] References Cited

U.S. PATENT DOCUMENTS

| | | |
|---|---|---|
| 3,718,506 | 2/1973 | Fisher et al. . |
| 4,476,198 | 10/1984 | Ackerman et al. .................. 429/32 |
| 4,686,159 | 8/1987 | Miyoshi .................. 429/39 |
| 4,761,349 | 8/1988 | McPheeters et al. .................. 429/38 X |
| 4,910,100 | 3/1990 | Nakanishi et al. .................. 429/32 |
| 5,023,152 | 6/1991 | Akagi .................. 429/32 |
| 5,100,744 | 3/1992 | Harashima .................. 429/34 X |
| 5,238,754 | 8/1993 | Yasuo et al. .................. 429/39 X |
| 5,288,562 | 2/1994 | Taniguchi et al. .................. 429/39 X |

FOREIGN PATENT DOCUMENTS

| | | |
|---|---|---|
| 0275661 | 7/1988 | European Pat. Off. . |
| 0355420 | 2/1990 | European Pat. Off. . |
| 0402569 | 12/1990 | European Pat. Off. . |
| 0419163 | 3/1991 | European Pat. Off. . |
| 0437175 | 7/1991 | European Pat. Off. . |
| 63-211573 | 9/1988 | Japan . |

Primary Examiner—Stephen Kalafut
Attorney, Agent, or Firm—Gifford, Groh, Sprinkle, Patmore and Anderson

[57] ABSTRACT

A solid-electrolyte fuel cell system includes a plurality of fuel cells stacked to form a cell assembly. Each cell has an electrolyte layer, an oxygen electrode applied to one surface of the electrolyte layer, a fuel electrode applied to the other surface of the electrolyte layer, an oxygen-containing gas passage opposed to the oxygen electrode, and a fuel gas passage opposed to the fuel electrode. An oxygen-containing gas supply passage is disposed at one end of the cell assembly, as seen in a stacking direction of the fuel cells, to communicate with the oxygen-containing gas passage. Fuel gas supply passages are disposed at opposite sides of the cell assembly. A combustion chamber is disposed at the other end of the cell assembly to communicate with the oxygen-containing gas passage and fuel gas passage for burning an oxygen-containing gas exhausted from the oxygen-containing gas passage and a fuel gas exhausted from the fuel gas passage.

7 Claims, 22 Drawing Sheets ated to a solid-electrolyte
SOLID-ELECTROLYTE FUEL CELL SYSTEM

BACKGROUND OF THE INVENTION

1. FIELD OF THE INVENTION

The present invention relates to a solid-electrolyte fuel cell system. More particularly, the invention relfuel cell system comprising a plurality of fuel cells each having an electrolyte layer, an oxygen electrode applied to one surface of the electrolyte layer, a fuel electrode applied to the other surface of the electrolyte layer, an oxygen-containing gas passage opposed to the oxygen electrode, and a fuel gas passage opposed to the fuel electrode, the fuel cells being stacked to form a cell assembly an oxygen-containing gas supply passage disposed peripherally of the cell assembly, as seen in a stacking direction of the fuel cells, to communicate with the oxygen-containing gas passage; and a fuel gas supply passage disposed peripherally of the cell assembly and separately from the oxygen-containing gas supply passage.

2. DESCRIPTION OF THE RELATED ART

In the conventional solid-electrolyte fuel cell system noted above, an oxygen-containing as exhausted from the oxygen-containing gas passages and a fuel gas exhausted from the fuel gas passages are burnt to produce heat for preheating an oxygen-containing gas to be supplied to the oxygen-containing gas passages. The cell assembly is maintained at a temperature enabling reformation of fuel gas stock into a fuel gas in the cells. Thus, the exhaust oxygen-containing gas and exhaust fuel gas are burnt in a location as close to the cell assembly as possible.

FIG. 28 shows such a solid-electrolyte fuel cell system known in the art. The system includes an oxygen-containing gas supply passage SI disposed in one peripheral position of a cell assembly NC as seen in a stacking direction thereof. This supply passage SI communicates with each oxygen-containing gas passage "s". An oxygen-containing gas exhaust passage SO is disposed in a peripheral position of the cell assembly NC opposite from the supply passage SI to withdraw the oxygen-containing gas from each oxygen-containing gas passage "s". A fuel gas supply passage FI is disposed in a different peripheral position of the cell assembly NC as seen in the stacking direction thereof. This supply passage FI communicates with each fuel gas passage "f". A fuel gas exhaust passage FO is disposed in a peripheral position of the cell assembly NC opposite from the fuel gas supply passage FI to withdraw the fuel gas from each fuel gas passage "f". The system further includes a combustion chamber KI spaced from the cell assembly NC to burn the oxygen-containing gas exhausted from the oxygen-containing gas passages "s" and the fuel gas exhausted from the fuel gas passages "f". The oxygen-containing gas is delivered from the oxygen-containing gas exhaust passage SO to the combustion chamber KI through exhaust oxygen-containing gas passages 21, while the fuel gas is delivered from the fuel gas exhaust passage FO to the combustion chamber KI through exhaust fuel gas passages 22.

The above solid-electrolyte fuel cell system has a disadvantage of complicated construction in that the oxygen-containing gas exhaust passage SO, fuel gas exhaust passage FO, exhaust oxygen-containing gas passages 21 and exhaust fuel gas passages 22 are required in addition to the oxygen-containing gas supply passage SI and fuel gas supply passage FI. Further, heat is radiated from the oxygen-containing gas exhaust passage SO, fuel gas exhaust passage FO, exhaust oxygen-containing gas passages 21 and exhaust fuel gas passages 22. The combustion chamber KI, which is spaced from the cell assembly NC, provides a low heating efficiency and releases a large amount of heat. Thus, the known system as a whole suffers a great heat loss.

The known system includes the oxygen-containing gas supply passage SI, fuel gas supply passage FI, oxygen-containing gas exhaust passage SO and fuel gas exhaust passage FO arranged peripherally of the cell assembly NC. Even though the combustion chamber KI also is disposed peripherally of the cell assembly NC, only a small space is available around the cell assembly NC for installing the combustion chamber KI. A minimal area is allowed for contact between the cell assembly NC and combustion chamber KI, which results in low heating efficiency and a large amount of heat radiation from the combustion chamber KI.

SUMMARY OF THE INVENTION

The present invention has been made having regard to the state of the art noted above, and its object is to provide a solid-electrolyte fuel cell system incorporating an improvement in combustion of exhaust oxygen-containing gas and exhaust fuel gas, thereby to simplify the construction and to diminish the heat loss through radiation.

The above object is fulfilled, according to the present invention, by a solid-electrolyte fuel cell system having a combustion chamber disposed peripherally of a cell assembly and separately from an oxygen-containing gas supply passage and a fuel gas supply passage, as seen in a stacking direction of fuel cells, and communicating with an oxygen-containing gas passage and a fuel gas passage to burn an oxygen-containing gas exhausted from the oxygen-containing gas passage and a fuel gas exhausted from the fuel gas passage.

The above construction, with the combustion chamber disposed peripherally of the cell assembly, as seen in the stacking direction of fuel cells, and communicating with the oxygen-containing gas passage and fuel gas passage, dispenses with the oxygen-containing gas exhaust passage, fuel gas exhaust passage, exhaust oxygen-containing gas passages and exhaust fuel gas passages required in the prior art. The oxygen-containing gas exhausted from the oxygen-containing gas passage and the fuel gas exhausted from the fuel gas passage may both flow directly into the combustion chamber to be burned therein. Since no oxygen-containing gas exhaust passage or fuel gas exhaust passage is disposed peripherally of the cell assembly, an increased space is available around the cell assembly for installing the combustion chamber. An increased area is allowed for contact between the cell assembly and combustion chamber to improve the heating efficiency and diminish heat radiation from the combustion chamber.

Each cell may have a planar, rectangular shape, and the solid-electrolyte fuel cell system may further comprise a passage defining element opposed to the oxygen electrode to define the oxygen-containing gas passage between the passage defining element and the oxygen electrode. In this construction, each cell defines oxygen-containing gas inlet at one end thereof, and oxygen-containing gas outlet at the other end. The cells are stacked to form the cell assembly with the fuel gas passage defined between an adjacent pair of the cells. Each cell further defines fuel inlet at one side thereof adjacent the oxygen-containing gas inlet, and fuel gas outlets at the other end having the oxygen-containing gas outlet. The oxygen-containing gas supply passage communicates with the oxygen-containing gas inlet. The fuel gas supply passage communicates with the fuel gas inlet. The combustion chamber communicates with the oxygen-containing gas outlet and the fuel gas outlet.

In the above construction, as seen in the stacking direction of the cells, the oxygen-containing gas supply passage is disposed at one end of the cell assembly, the fuel gas supply passage is disposed at one side of the cell assembly adjacent the oxygen-containing gas supply passage, and the combustion chamber is disposed at the other end of the cell assembly. The oxygen-containing gas flows from the oxygen-containing gas inlet straight through the oxygen-containing gas passage to the oxygen-containing gas outlet to be exhausted into the combustion chamber. The fuel gas flows from the fuel gas inlet through the fuel gas passage, which is curved, to the fuel gas outlet to be exhausted into the combustion chamber. The oxygen-containing gas exhausted from the oxygen-containing gas passage and the fuel gas exhausted from the fuel gas passage are burnt in the combustion chamber.

The fuel gas inlet may be formed at each of opposite sides of each cell adjacent the oxygen-containing gas inlet, with fuel gas supply passages communicating with the fuel gas inlets at the opposite sides.

In this above construction, as seen in the stacking direction of the cells, the oxygen-containing gas supply passage is disposed at one end of the cell assembly, the fuel gas supply passages are disposed at the opposite sides of the cell assembly adjacent the oxygen-containing gas supply passage, and the combustion chamber is disposed at the other end of the cell assembly. The fuel gas flows from the fuel gas inlets at the opposite sides through the fuel gas passages, which are curved, to the fuel gas outlet to be exhausted into the combustion chamber.

The solid-electrolyte fuel cell system may further comprise inlet defining elements for defining the fuel gas inlets in positions of each cell adjacent the oxygen-containing gas inlets.

In this construction, the fuel gas inlets are disposed close to the oxygen-containing gas inlets and away from the fuel gas outlets. The fuel gas entering the fuel gas inlets turns at a substantially right angle in the fuel gas passages adjacent the oxygen-containing gas inlets to flow toward the fuel gas outlet. Thus, the fuel gas flows in contact with an entire area of the fuel electrode.

The system may include two cell assemblies arranged side by side and sharing the combustion chamber.

Then the combustion chamber may be disposed between the two cell assemblies to minimize exposure of the combustion chamber to ambient air.

This minimizes the heat radiation from the combustion chamber to diminish heat loss.

Thus, the present invention realizes a simplified construction by dispensing with the oxygen-containing gas exhaust passage, fuel gas exhaust passage, exhaust oxygen-containing gas passages and exhaust fuel gas passages required in the prior art. This construction, therefore, is free from the heat radiation from the oxygen-containing gas exhaust passage, fuel gas exhaust passage, exhaust oxygen-containing gas passages and exhaust fuel gas passages as in the prior art. The heat radiation from the combustion chamber is now diminished to lower heat loss as a whole.

Further and other objects, features and effects of the invention will become apparent from the following more detailed description of the embodiments of the invention taken with reference to the accompanying drawings.

DETAILED DESCRIPTION OF THE PREFERRED EMBODIMENTS

Solid-electrolyte fuel cell systems according to the present invention will be described in detail with reference to the drawings.

Figure 1:
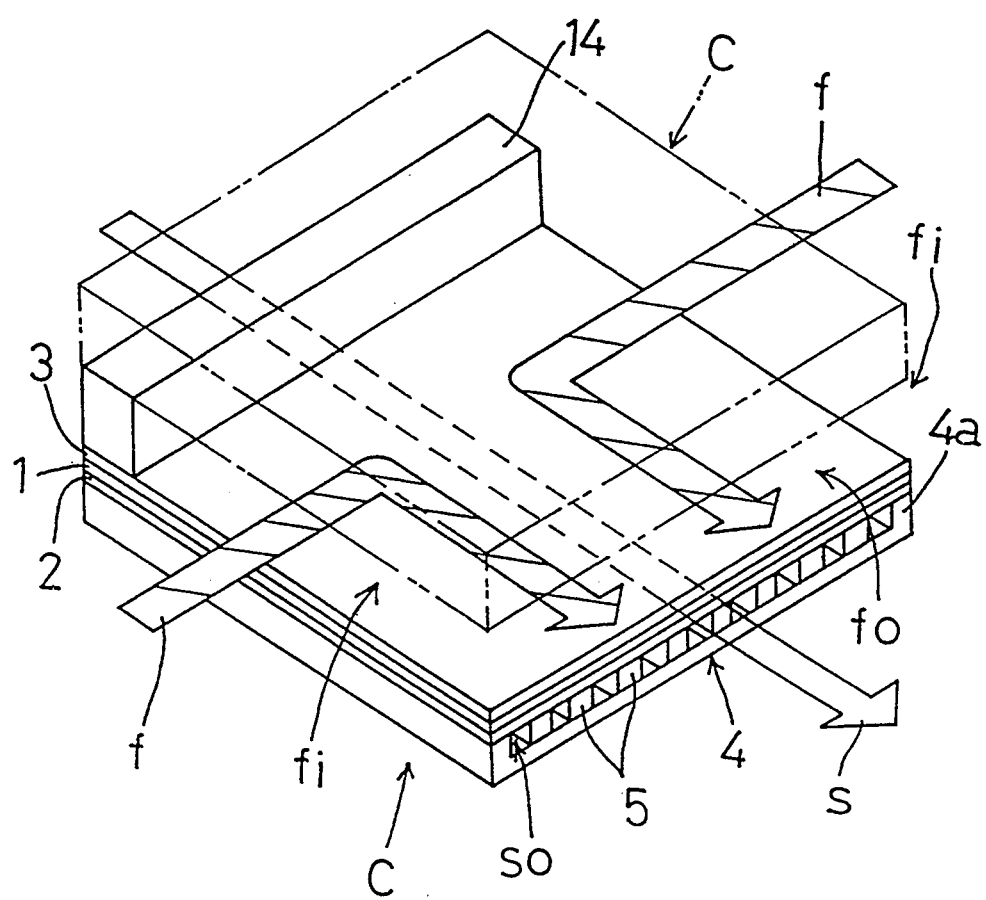
FIG. 1 is a perspective view of a cell in a solid-electrolyte fuel cell system according to the present invention.

First, cells C in the fuel cell systems will be described referring to FIG. 1.

Each cell C has a solid-electrolyte layer 1 in the form of a rectangular plate, an oxygen electrode 2 in the form of a layer or plate applied to one surface of the solid-electrolyte layer 1 to extend substantially over an entire area thereof, and a fuel electrode 3 also in the form of a layer or plate applied to the other surface of the solid-electrolyte layer 1 to extend substantially over the entire area thereof. Thus, the cell C has a three-layer plate structure of rectangular shape in plan view, to derive an electromotive force from the oxygen electrode 2 and fuel electrode 3.

The solid-electrolyte layer 1 is formed of tetragonal zirconia ($ZrO_2$) which is a solid solution of ytterbia ($Y_2O_3$) in about 3 mol %, or other appropriate material. The oxygen electrode 2 is formed of lanthanum-manganese oxide ($LaMnO_3$) or other appropriate material. The fuel electrode 3 is formed of a cermet of nickel (Ni) and zirconia ($ZrO_2$) or other appropriate material.

A conductive separator 4 is attached to the oxygen electrode 2 of the three-layer structure to act as a passage defining element. The separator 4 has a pair of ridges 4a bonded throughout entire lengths thereof to the oxygen electrode 2 to define an oxygen-containing gas passage "s" between the oxygen electrode 2 and separator 4. Entire peripheral regions of the conductive separator 4 and three-layer plate structure, as seen in a direction of flow through the oxygen-containing gas passage "s" provide fuel gas passages "f" partitioned from the oxygen-containing gas passage "s". Thus, the cell C has the oxygen-containing gas passage "s" opposed to the oxygen electrode 2, and the fuel gas passages "f" opposed to the fuel electrode 3.

The separator 4 is formed of lanthanum-chromium oxide ($LaCrO_3$) or other appropriate material that has excellent resistance to oxidation and reduction.

The oxygen-containing gas passage "s" has oxygen-side conductive elements 5 arranged substantially equidistantly and parallel to one another therein and in tight contact with the oxygen electrode 2 and separator 4. This construction provides an increased sectional area for an electric passage from the oxygen electrode 2 to the separator 4 acting as a cell terminal.

The oxygen-side conductive elements 5 are formed of lanthanum-manganese oxide ($LaMnO_3$) or other appropriate material that has excellent oxidation resistance.

Figure 2:
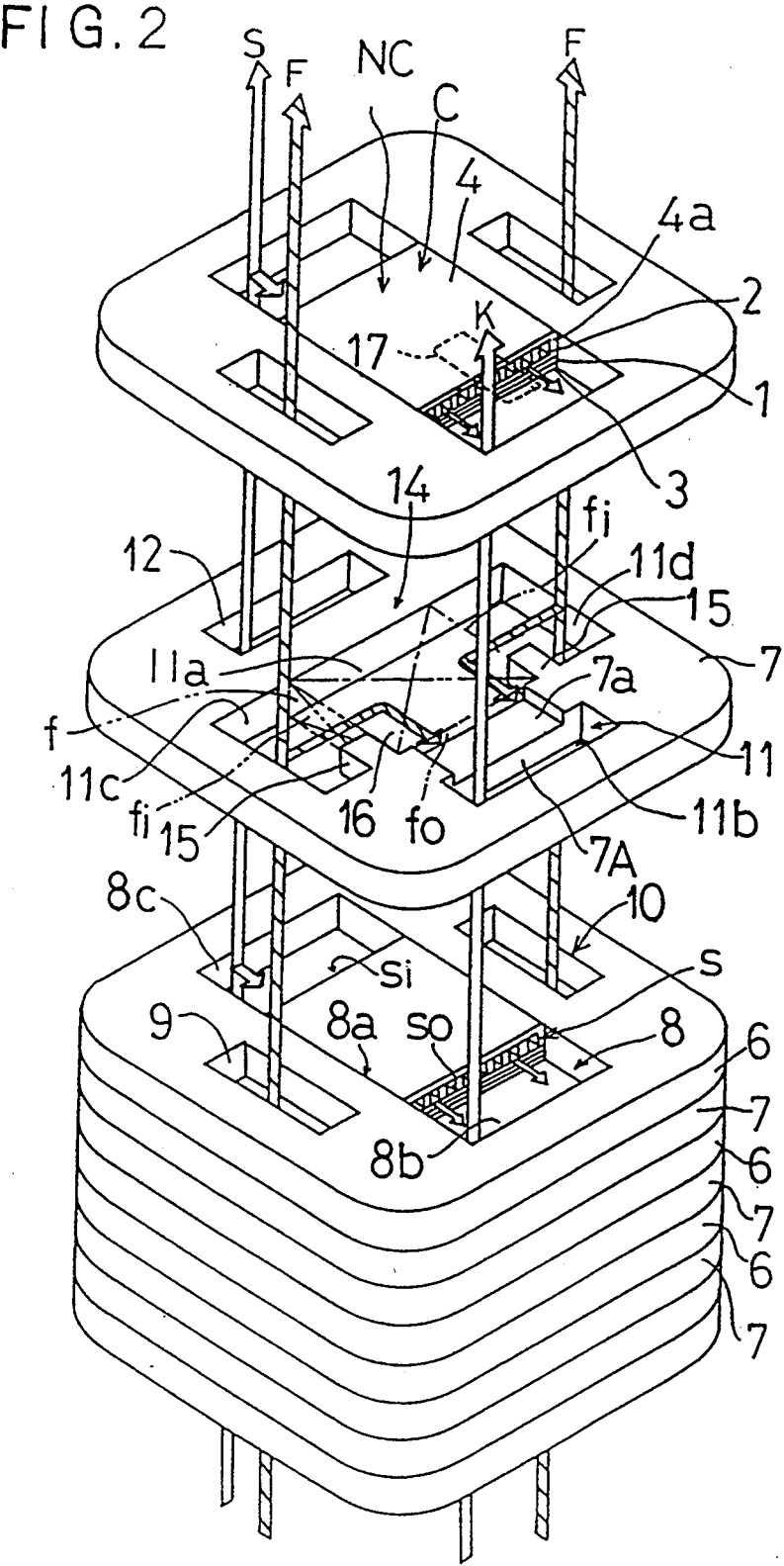
FIG. 2 is an exploded perspective view of the solid-electrolyte fuel cell system.
Figure 3:
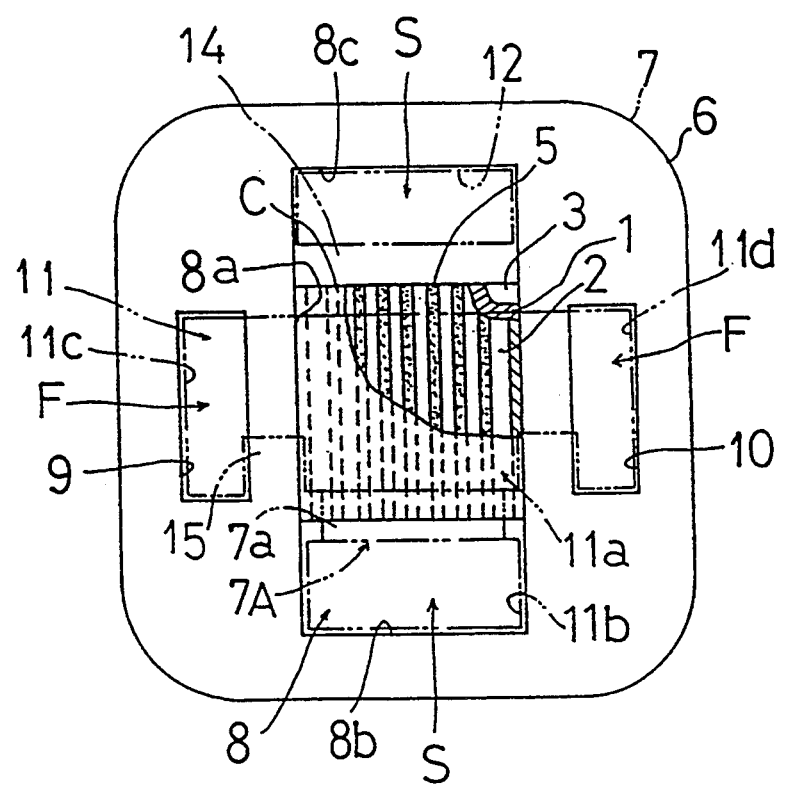
FIG. 3 is a sectional plan view of the solid-electrolyte fuel cell system.
Figure 4:
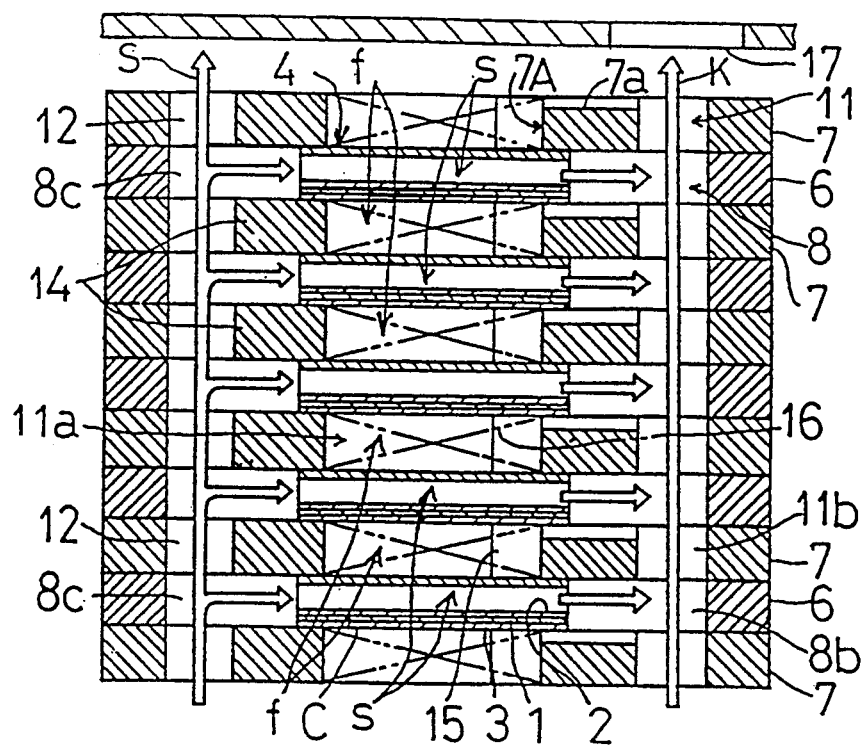
FIG. 4 is a sectional side view of the solid-electrolyte fuel cell system.
Figure 5:
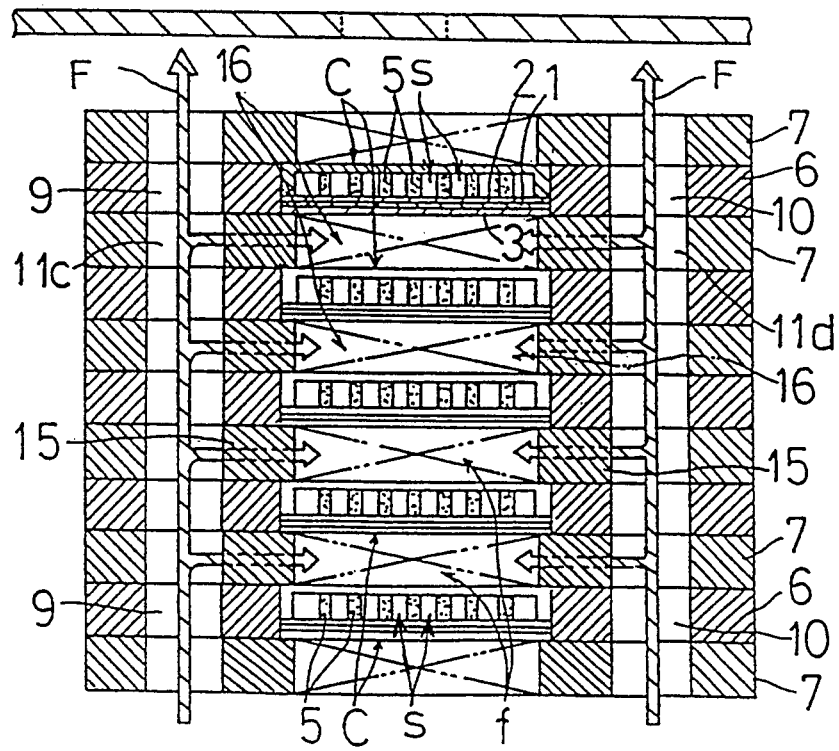
FIG. 5 is a sectional front view of the solid-electrolyte fuel cell system.

As shown in FIG. 2, the oxygen-containing gas passage "s" has an oxygen-containing gas inlet "si" at one end of the cell C, and an oxygen-containing gas outlet "so" at the other end of the cell C. An oxygen-containing gas flows straight from the inlet "si" to the outlet "so".

A plurality of such cells C are stacked one over another, with a space formed between an adjacent pair of cells C. A seal element 14 is disposed between and in tight contact with an adjacent pair of cells C and opposed to the oxygen-containing gas inlet "si". Consequently, the fuel gas passages "f" are formed between the adjacent pair of cells C, with fuel gas inlets "fi" formed in opposite lateral edges adjacent the ends of the cells C having the oxygen-containing gas inlets "si". Fuel gas outlets "fo" are formed at the same ends of the cells C having the oxygen-containing gas outlets "so". A fuel gas may flow from the inlets "fi" to the outlets "fo" through curved passages.

How a plurality of cells C are stacked to form a cell assembly, with the fuel gas passages "f" defined between each adjacent pair of cells C, will be described next with reference to FIGS. 2 through 5.

The illustrated system includes first plates 6 and second plates 7 stacked alternately. The first plates 6 have substantially the same thickness as the cells C. The second plates 7 are placed in a predetermined orientation relative to the first plates 6. Each of the first plates 6 includes a cell receiving opening 8. This opening 8 has a cell receiving region 8a for accommodating the cell C with a gastight state secured adjacent the oxygen-containing gas inlet "si" between the opposite sides of the cell C where the oxygen-containing gas passage "s" is closed by the separator 4, and inner walls of the opening 8 opposed thereto. The opening 8 further includes a first blank region 8b continuous from one end of the cell receiving region 8a, and a second blank region 8c continuous from the other end thereof.

The cell C is placed in the cell receiving opening 8, with the outlets "so" and "fo" communicating with the first blank region 8b, and the inlet "si" communicating with the second blank region 8c.

Each of the first plates 6 further includes a first communicating opening 9 and a second communicating opening 10 distributed to opposite sides of the cell receiving region 8a.

Each of the second plates 7 includes an intercellular passage defining opening 11. This opening 11 has a passage defining region 11a, and a fourth blank region 11b spaced from one end of the passage defining region 11a. The fourth blank region 11b is in phase with the first blank regions 8b of the first plates 6. The passage defining region 11a has a fifth blank region 11c and a sixth blank region 11d disposed at opposite sides thereof. The fifth blank region 11c communicates with the first communicating openings 9 in the first plates 6, while the sixth blank region 11d communicates with the second communicating openings 10 in the first plates 6. Each of the second plates 7 further includes a thin wall section 7A having a recessed upper surface 7a for intercommunicating the passage defining region 11a and the fourth blank region 11b.

Each of the second plates 7 also includes a third communicating opening 12 for communicating with the second blank regions 8c of the first plates 6.

In each of the second plates 7, the passage defining region 11a of the intercellular passage defining opening 11 is separated from the third communicating opening 12. The seal element 14 is formed to provide a gastight condition between the passage defining region 11a of intercellular passage defining opening 11 in each of the second plates 7 and the second blank region 8c of the cell receiving opening 8 in each of the first plates 6.

Further, each of the second plates 7 includes inlet defining elements 15 projecting into the intercellular passage defining opening 11 in a direction away from the fourth blank region 11b. Each inlet defining element 15 defines a constricted passage between the passage defining region 11a and fifth blank region 11c or between the passage defining region 11a and sixth blank region 11d.

The first plates 6 and second plates 7 are stacked alternately and in a predetermined relative phase to form the cell assembly NC. The first plates 6 accommodate the cells C therein, respectively. Each of the second plates 7 has a fuel-side flexible conductive material 16 filled into the passage defining region 11a of the intercellular passage defining opening 11. This conductive material 16 allows passage of a gas, and is capable of absorbing thermal distortion occurring in the direction of width of the cells C. The first blank regions 8b of the cell receiving openings 8 in the first plates 6 and the fourth blank regions 11b of the intercellular passage defining openings 11 in the second plates 7 define a first space K extending in the stacking direction. The second blank regions 8c of the cell receiving openings 8 in the first plates 6 and the third communicating openings 12 in the second plates 7 define a second space S extending in the stacking direction. The first communicating openings 9 in the first plates 6 and the fifth blank regions 11c of the intercellular passage defining openings 11 in the second plates 7 define a third space F extending in the stacking direction. The second communicating openings 10 in the first plates 6 and the sixth blank regions 11d of the intercellular passage defining openings 11 in the second plates 7 define another third space F extending in the stacking direction.

In the cell assembly NC, the inlet defining elements 15 are disposed at the opposite sides of adjacent cells C arranged in the stacking direction. These inlet defining elements 15 support the adjacent cells C in a spaced relationship.

The passage defining region 11a of the intercellular passage defining opening 11 in each of the second plates 7 defines the fuel gas passages "f" of the cell C. The positions of the fuel gas passages "f" corresponding to the constricted passages formed by the inlet defining elements 15 adjacent the oxygen-containing gas inlet "si" of the cell C define the fuel gas inlets "fi". The positions of the fuel gas passages "f" opposed to the fourth blank region 11b define the fuel gas outlet "fo".

The fuel-side flexible conductive material 16 comprises a felt-like nickel material or other appropriate material having resistance to heat and reduction.

In the above construction, the second space S communicates with the oxygen-containing gas inlet "si". The third spaces F communicate with the fuel gas inlets "fi" formed in the opposite sides of each cell C, respectively. The first space K communicates with each of the oxygen-containing gas outlets "so" and fuel gas outlets "fo".

The second space S defines an oxygen-containing gas supply passage for supplying the oxygen-containing gas to the oxygen-containing gas passages "s". The third spaces F define fuel gas supply passages for supplying the fuel gas to the fuel gas passages "f", respectively. The first space K defines a combustion chamber for burning the oxygen-containing gas exhausted from the oxygen-containing gas passage "s" and the fuel gas exhausted from the fuel gas passages "f". An exhaust opening 17 is formed in an upper position of the combustion chamber K for discharging combustion exhaust.

That is, an oxygen-containing gas supply passage S is formed at one side of the cell assembly NC, as seen in the stacking direction of the cell assembly NC, to communicate with the oxygen-containing gas passage "s". Fuel gas supply passages F are formed at opposite sides of the cell assembly NC adjacent the oxygen-containing gas supply passage S to communicate with the fuel gas passages "f". The combustion chamber K is formed at the side of the cell assembly NC opposite from the oxygen-containing gas supply passage S to communicate with the oxygen-containing gas passage "s" and fuel gas passages "f".

In the solid-electrolyte fuel cell system having the above construction, the oxygen-containing gas is supplied from the oxygen-containing gas supply passage S to flow straight through the oxygen-containing gas passage "s" and directly into the combustion chamber K. The fuel gas is supplied from the fuel gas supply passages F to the fuel gas passages "f" at the opposite sides to flow through the curved fuel gas passages "f" and directly into the combustion chamber K. The exhausted oxygen-containing gas and fuel gas are burnt in the combustion chamber K.

Another embodiment will be described with reference to FIGS. 6 through 9.

Each of first plates 6 includes a cell receiving opening 8. This opening 8 has two cell receiving regions 8a for accommodating cells C with a gastight state secured adjacent the oxygen-containing gas inlets "si" between the opposite sides of the cells C where the oxygen-containing gas passages "s" are closed by the separators 4, and inner walls of the opening 8 opposed thereto. The opening 8 further includes a first blank region 8b defined between the two cell receiving regions 8a, and a second blank region 8c and a third blank region 8d in opposite ends of the opening 8.

In this way, two cells C are placed in the cell receiving opening 8, with the outlets "so" and "fo" of one cell C opposed to those of the other. The outlets "so" and "fo" of the respective cells C communicate with the first blank region 8b. The oxygen-containing gas inlet "si" of one cell C communicates with the second blank region 8c, while the oxygen-containing gas inlet "si" of the other cell C communicates with the third blank region 8d.

Each of the first plates 6 further includes a first communicating opening 9 and a second communicating opening 10 distributed to opposite sides of the cell receiving region 8a.

Each of second plates 7 includes an intercellular passage defining opening 11. This opening 11 has two passage defining regions 11a, and a fourth blank region 11b between the passage defining regions 11a. The fourth blank region 11b is in phase with the first blank regions 8b of the first plates 6. Each passage defining region 11a has a fifth blank region 11c and a sixth blank region 11d disposed at opposite sides thereof. The fifth blank region 11c communicates with the first communicating openings 9 of the first plates 6, while the sixth blank region 11d communicates with the second communicating openings 10 of the first plates 6. Each of the second plates 7 further includes two thin wall sections 7A each having a recessed upper surface 7a for intercommunicating one of the passage defining regions 11a and the fourth blank region 11b.

Each of the second plates 7 also includes a third communicating opening 12 and a fourth communicating opening 13 distributed to opposite ends thereof in a direction perpendicular to the direction of arrangement of the passage defining region 11a and fifth and sixth blank regions 11c and 11d of the intercellular passage defining opening 11. The third communicating opening 12 communicates with the second blank regions 8c of the first plates 6, while the fourth communicating opening 13 communicates with the third blank regions 8d of the cell receiving openings 8 in the first plates 6.

In each of the second plates 7, one of the passage defining regions 11a of the intercellular passage defining opening 11 is separated from the third communicating opening 12. The other passage defining region 11a is separated from the fourth communicating opening 13. Seal elements 14 are formed to provide a gastight condition between one of the passage defining regions 11a of the second plate 7 and the second blank region 8c of the cell receiving opening 8 in each of the first plates 7, and between the other passage defining region 11a of the second plate and the third blank region 8d of the cell receiving opening 8 in each of the first plates 7.

Further, each of the second plates 7 includes inlet defining elements 15 projecting into the intercellular passage defining opening 11 in a direction away from the fourth blank region 11b. Each inlet defining element 15 defines a constricted passage between the passage defining region 11a and fifth blank region 11c or between the passage defining region 11a and sixth blank region 11d.

The first plates 6 and second plates 7 are stacked alternately and in a predetermined relative phase to form two cell assemblies NC. Each of the first plates 6 accommodates two cells C therein. Each of the second plates 7 has a fuel-side flexible conductive material 16 filled into each passage defining region 11a of the intercellular passage defining opening 11. This conductive material 16 allows passage of the gas, and is capable of absorbing thermal distortion occurring in the direction of width of the cells C. The first blank regions 8b of the cell receiving openings 8 in the first plates 6 and the fourth blank regions 11b of the intercellular passage defining openings 11 in the second plates 7 define a first space K extending in the stacking direction. The two cell assemblies NC are opposed to each other across the first space K. The second blank regions 8c of the cell receiving openings 8 in the first plates 6 and the third communicating openings 12 in the second plates 7 define a second space S extending in the stacking direction. The third blank regions 8d of the cell receiving openings 8 in the first plates 6 and the fourth communicating openings 13 in the second plates 7 define another second space S extending in the stacking direction. The first communicating openings 9 in the first plates 6 and the fifth blank regions 11c of the intercellular passage defining openings 11 in the second plates 7 define third space F extending in the stacking direction. The second communicating openings 10 in the first plates 6 and the sixth blank regions 11d of the intercellular passage defining openings 11 in the second plates 7 define another third space F extending in the stacking direction.

In each cell assembly NC, the inlet defining elements 15 are disposed at the opposite sides of adjacent cells C arranged in the stacking direction. Each thin wall section 7A has ridges disposed in corners opposed to the first blank region 8b of the cell receiving opening 8 between the cells C. These inlet defining elements 15 and ridges of the thin wall section 7A support the adjacent cells C in a spaced relationship.

Each passage defining region 11a of the intercellular passage defining opening 11 in each of the second plates 7 defines the fuel gas passages "f" of the cell C. The positions of the fuel gas passages "f" corresponding to the constricted passages formed by the inlet defining elements 15 adjacent the oxygen-containing gas inlet "si" of the cell C define the fuel gas inlets "fi". The positions of the fuel gas passages "f" opposed to the fourth blank region 11b define the fuel gas outlet "fo".

In the above construction, the second spaces S communicate with the oxygen-containing gas inlets "si" of the two cell assemblies NC, respectively. The third spaces F communicate with the fuel gas inlets "fi" formed in the opposite sides of each cell C. The first space K communicates with each of the oxygen-containing gas outlets "so" and fuel gas outlets "fo".

Each of the second spaces S defines an oxygen-containing gas supply passage for supplying the oxygen-containing gas to the oxygen-containing gas passages "s". Each of the third spaces F defines a fuel gas supply passage for supplying the fuel gas to the fuel gas passages "f". The first space K defines a combustion chamber for burning the oxygen-containing gas exhausted from the oxygen-containing gas passages "s" and the fuel gas exhausted from the fuel gas passages "f".

That is, an oxygen-containing gas supply passage S is formed at one side of each cell assembly NC, as seen in the stacking direction of the cell assembly NC, to communicate with the oxygen-containing gas passages "s". Fuel gas supply passages F are formed at opposite sides of each cell assembly NC adjacent the oxygen-containing gas supply passage S to communicate with the fuel gas passages "f". The combustion chamber K is formed at the side of each cell assembly NC opposite from the oxygen-containing gas supply passage S to communicate with the oxygen-containing gas passages "s" and fuel gas passages "f". The combustion chamber K is disposed between and shared by the two cell assemblies NC.

In the solid-electrolyte fuel cell system having the above construction, the oxygen-containing gas is supplied from the oxygen-containing gas supply passages S to flow straight through the oxygen-containing gas passages "s" and directly into the combustion chamber K. The fuel gas is supplied from the fuel gas supply passages F to opposite sides of the fuel gas passages "f" to flow through the curved fuel gas passages "f" and directly into the combustion chamber K. The exhausted oxygen-containing gas and fuel gas are burned in the combustion chamber K.

A further embodiment will be described with reference to FIGS. 10 through 13.

Each of first plates 6 includes a plurality of cell receiving openings 8 defined by partition walls 18 and arranged at predetermined intervals. Each partition wall 18 includes a communicating section 19 for intercommunicating first blank regions 8b adjacent cell receiving openings 8.

Each of second plates 7 includes an intercellular passage defining opening 11. This opening 11 has passage defining regions 11a each shared by the cell receiving openings 8 in the first plates 6, and a fourth blank region 11b opposed to and shared by the first blank regions 8b in the first plates 6. Each of the second plates 7 also includes a third communicating opening 12 and a fourth communicating opening 13. The third communicating opening 12 communicates with second blank regions 8c of the cell receiving openings 8 in the first plates 6, while the fourth communicating opening 13 communicates with third blank regions 8d of the cell receiving openings 8 in the first plates 6. Each of the second plates 7 further includes two thin wall sections 7A each between the fourth blank region 11b and one of the passage defining regions 11a. Each thin wall section 7A has recessed upper surfaces 7a opposed to the cell receiving regions 8a of the cell receiving opening 8 in the first plates 6. Each recessed upper surface 7a intercommunicates the fourth blank region 11b and one of the passage defining regions 11a.

In each of the second plates 7, one of the passage defining regions 11a of the intercellular passage defining opening 11 is separated from the third communicating opening 12. The other passage defining region 11a is separated from the fourth communicating opening 13. Seal elements 14 are formed to provide a gastight condition between one of the passage defining regions 11a of the second plate 7 and the second blank region 8c of the cell receiving opening 8 in each of the first plates 7, and between the other passage defining region 11a of the second plate 7 and the third blank region 8d of the cell receiving opening 8 in each of the first plates 7.

The first plates 6 and second plates 7 are stacked alternately and in a predetermined relative phase to form a plurality of cell assemblies NC. Each of the first plates 6 accommodates two rows of cells C therein, with outlets "so" and "fo" of one row opposed to those of the other row. Each of the second plates 7 has a fuel-side flexible conductive material 16 filled into each passage defining region 11a of the intercellular passage defining opening 11.

In each cell assembly NC, the thin wall section 7A has ridges disposed in corners opposed to the first blank region 8b of the cell receiving opening 8 between the cells C. These ridges of the thin wall section 7A support the adjacent cells C in a spaced relationship.

The passage defining regions 11a of the intercellular passage defining openings 11 in each of the second plates 7 define the fuel gas passages "f" of the cells C arranged in rows. The positions of the fuel gas passages "f" corresponding to the constricted passages formed by the inlet defining elements 15 adjacent the oxygen-containing gas inlets "si" of the cell C define the fuel gas inlets "fi". The positions of the fuel gas passages "f" opposed to the fourth blank region 11b define the fuel gas outlets "fo".

That is, an oxygen-containing gas supply passage S is formed at one side of each cell assembly NC, as seen in the stacking direction of the cell assembly NC, to communicate with the oxygen-containing gas passages "s". Fuel gas supply passages F are formed at opposite sides of each row of cell assemblies NC adjacent the oxygen-containing gas supply passage S to communicate with the fuel gas passages "f". A combustion chamber K is formed at the side of each cell assembly NC opposite from the oxygen-containing gas supply passage S to communicate with the oxygen-containing gas passages "s" and fuel gas passages "f".

The cell assemblies NC are arranged in two rows, and the combustion chambers K are disposed between and shared by the two rows of cell assemblies NC.

In the solid-electrolyte fuel cell system having the above construction, the oxygen-containing gas is supplied from the oxygen-containing gas supply passages S to flow straight through the oxygen-containing gas passages "s" and directly into the combustion chambers K. The fuel gas is supplied from the fuel gas supply passages F to opposite sides of the fuel gas passages "f" to flow through the curved fuel gas passages "f" and directly into the combustion chambers K. The exhausted oxygen-containing gas and fuel gas are burnt in the combustion chambers K.

A still further embodiment will be described with reference to FIGS. 14 through 17.

Figure 6:
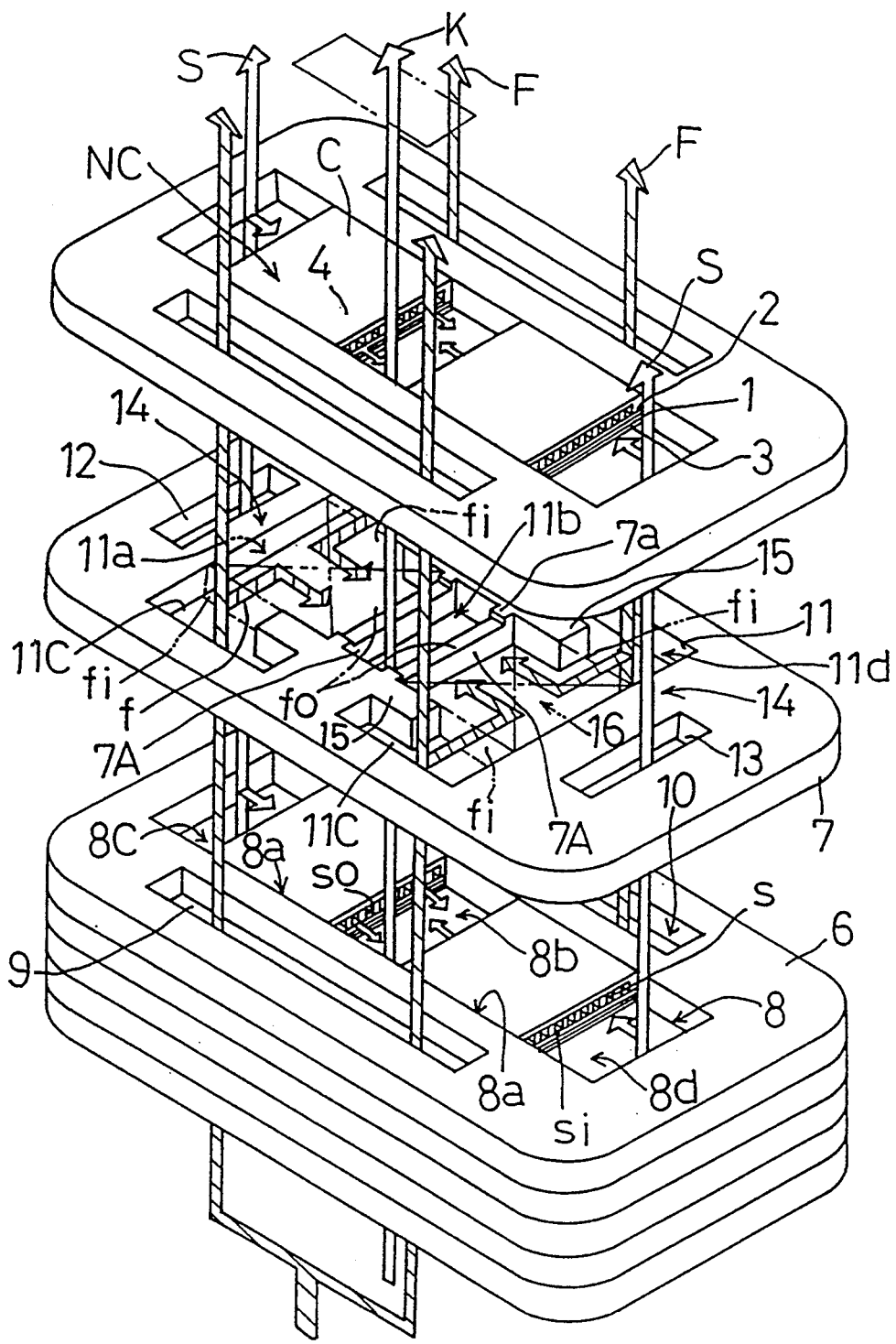
FIG. 6 is an exploded perspective view of a solid-electrolyte fuel cell system in another embodiment of the invention.
Figure 7:
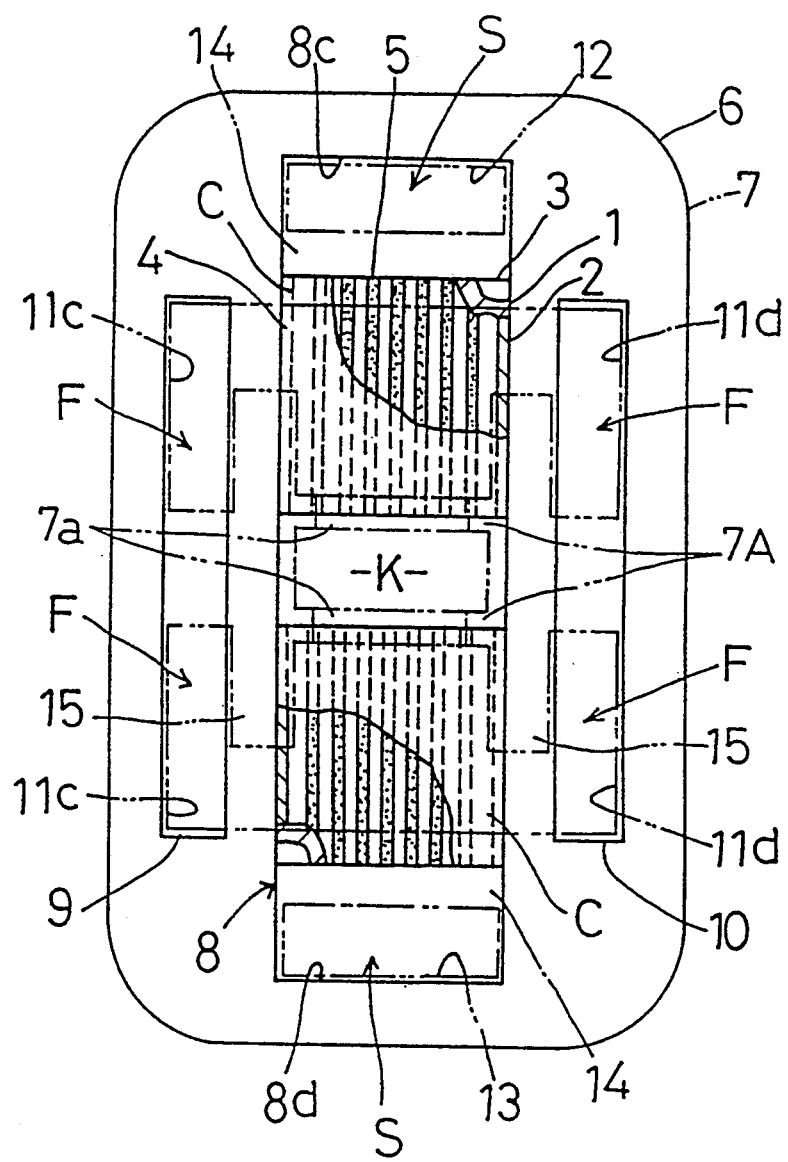
FIG. 7 is a sectional plan view of the solid-electrolyte fuel cell system shown in FIG. 6.
Figure 8:
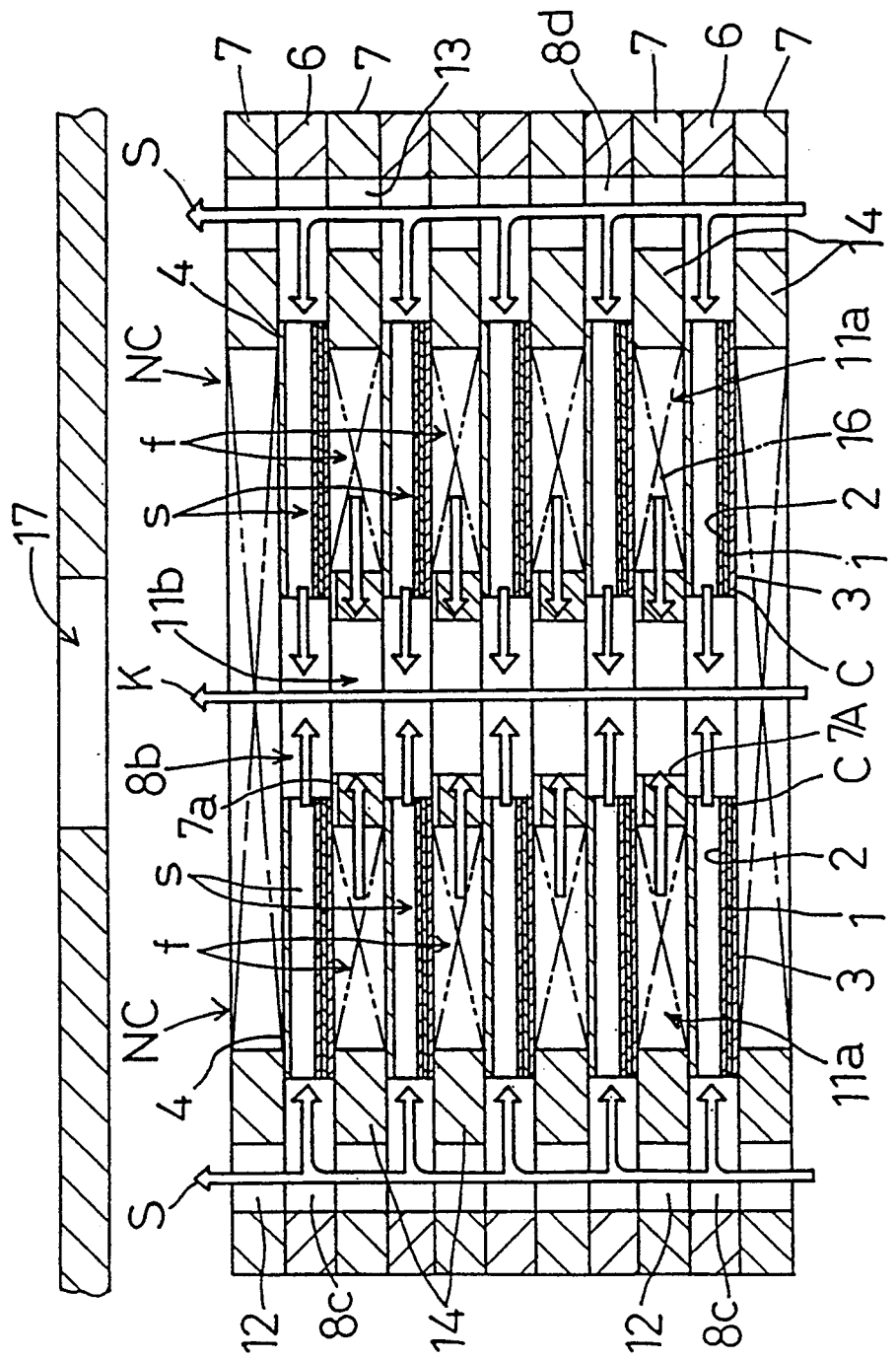
FIG. 8 is a sectional side view of the solid-electrolyte fuel cell system shown in FIG. 6.
Figure 9:
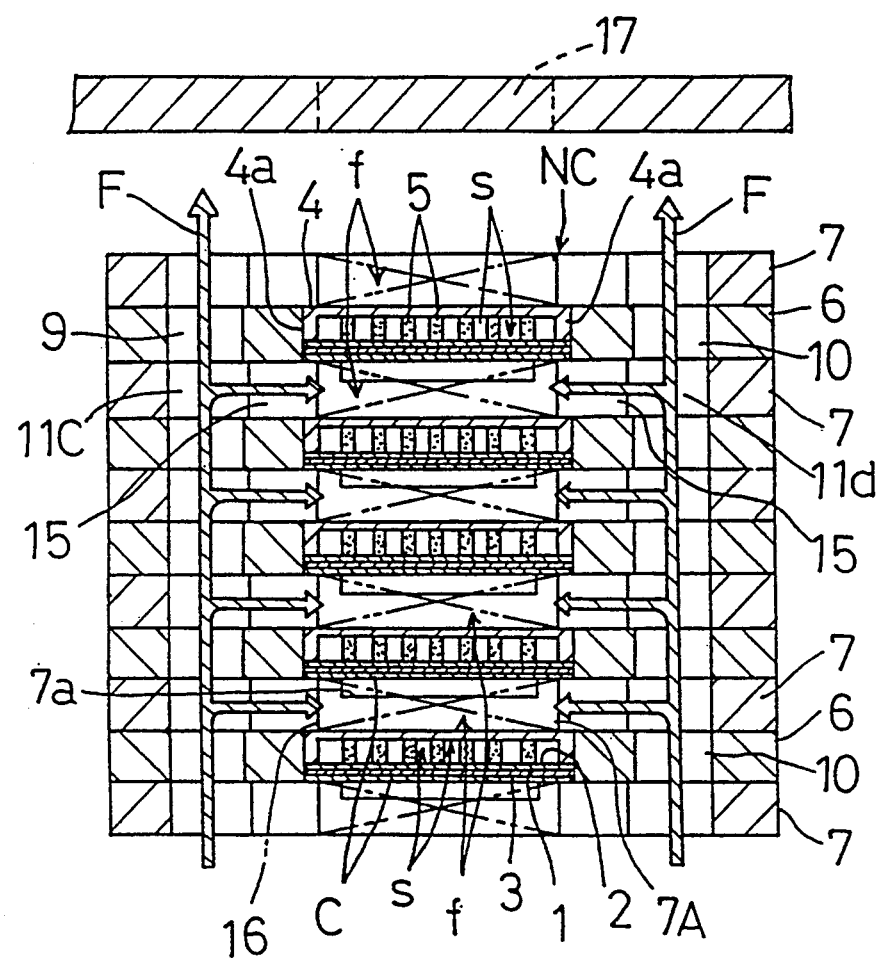
FIG. 9 is a sectional front view of the solid-electrolyte fuel cell system shown in FIG. 6.
Figure 10:
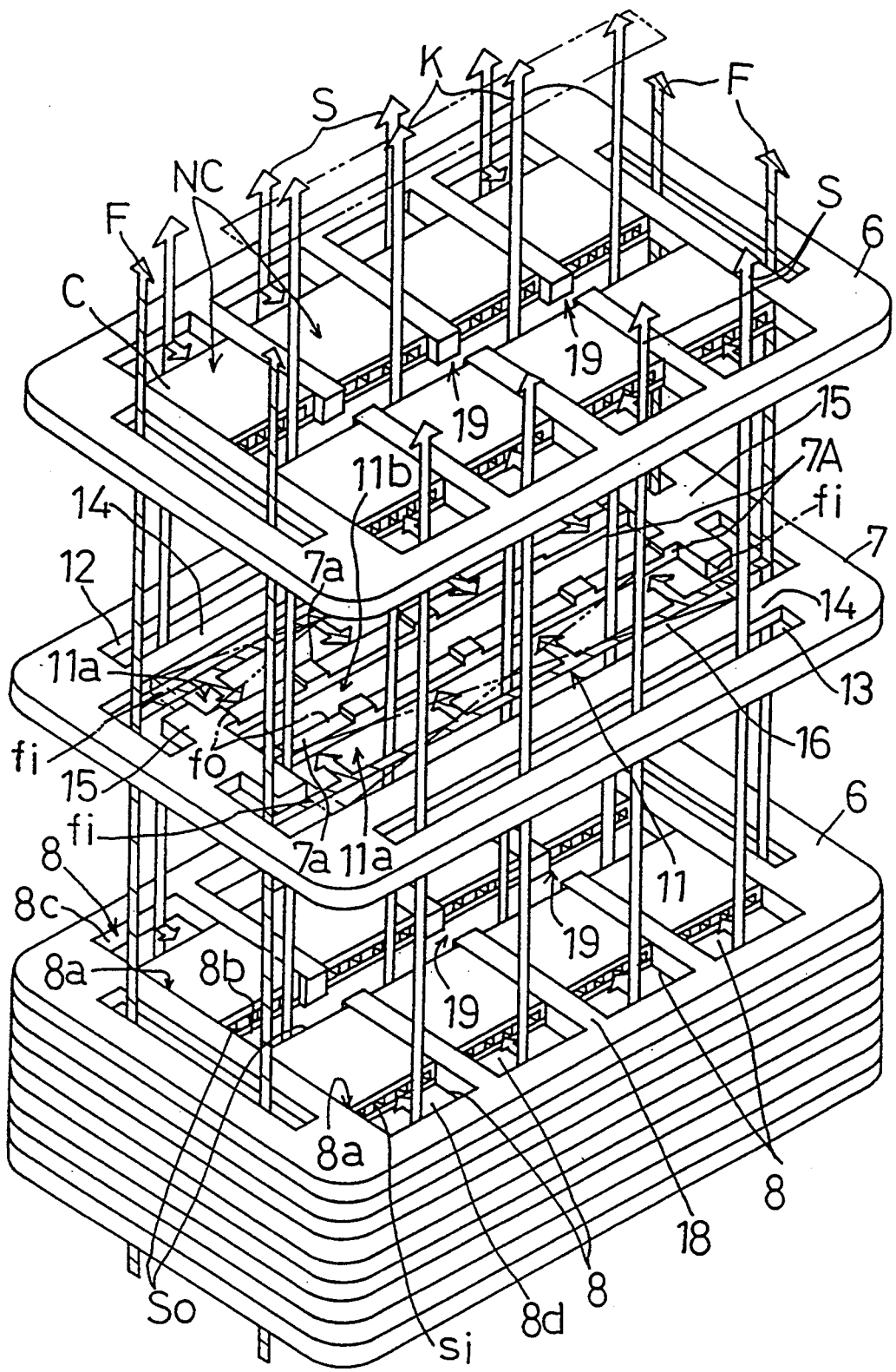
FIG. 10 is an exploded perspective view of a solid-electrolyte fuel cell system in a further embodiment of the invention.
Figure 11:
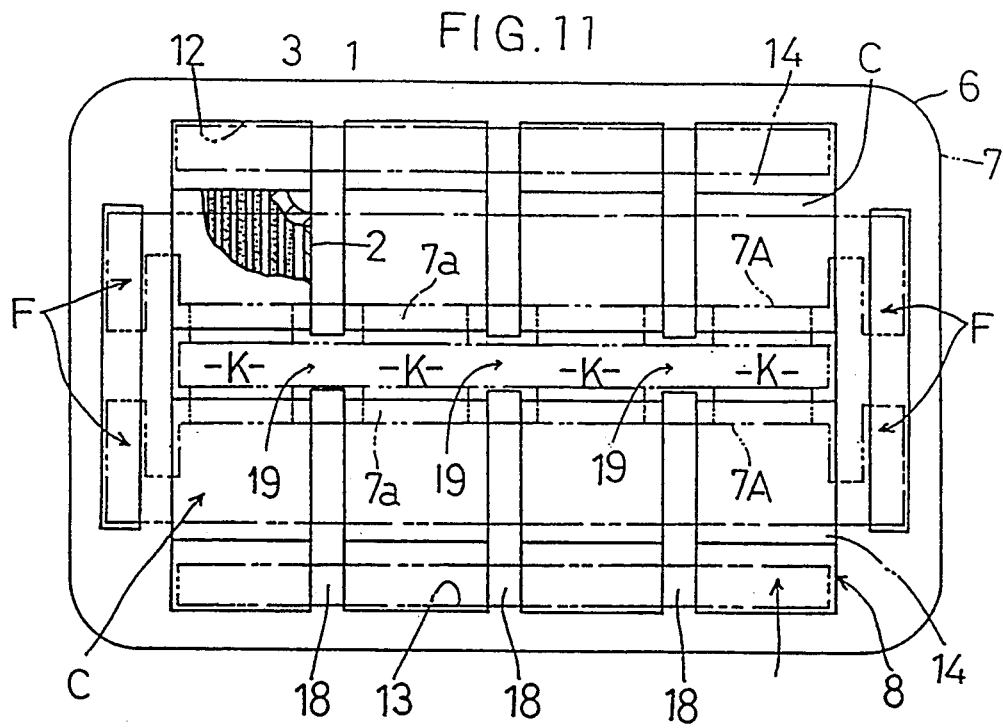
FIG. 11 is a sectional plan view of the solid-electrolyte fuel cell system shown in FIG. 10.
Figure 12:
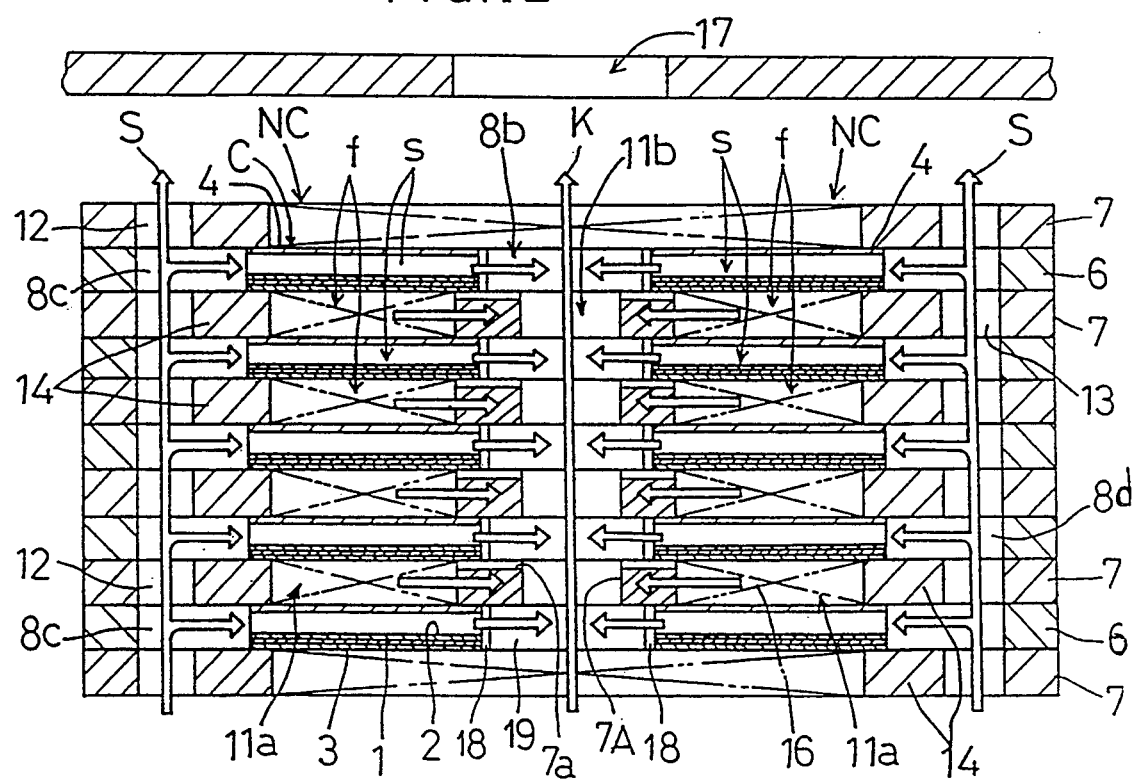
FIG. 12 is a sectional side view of the solid-electrolyte fuel cell system shown in FIG. 10.
Figure 13:
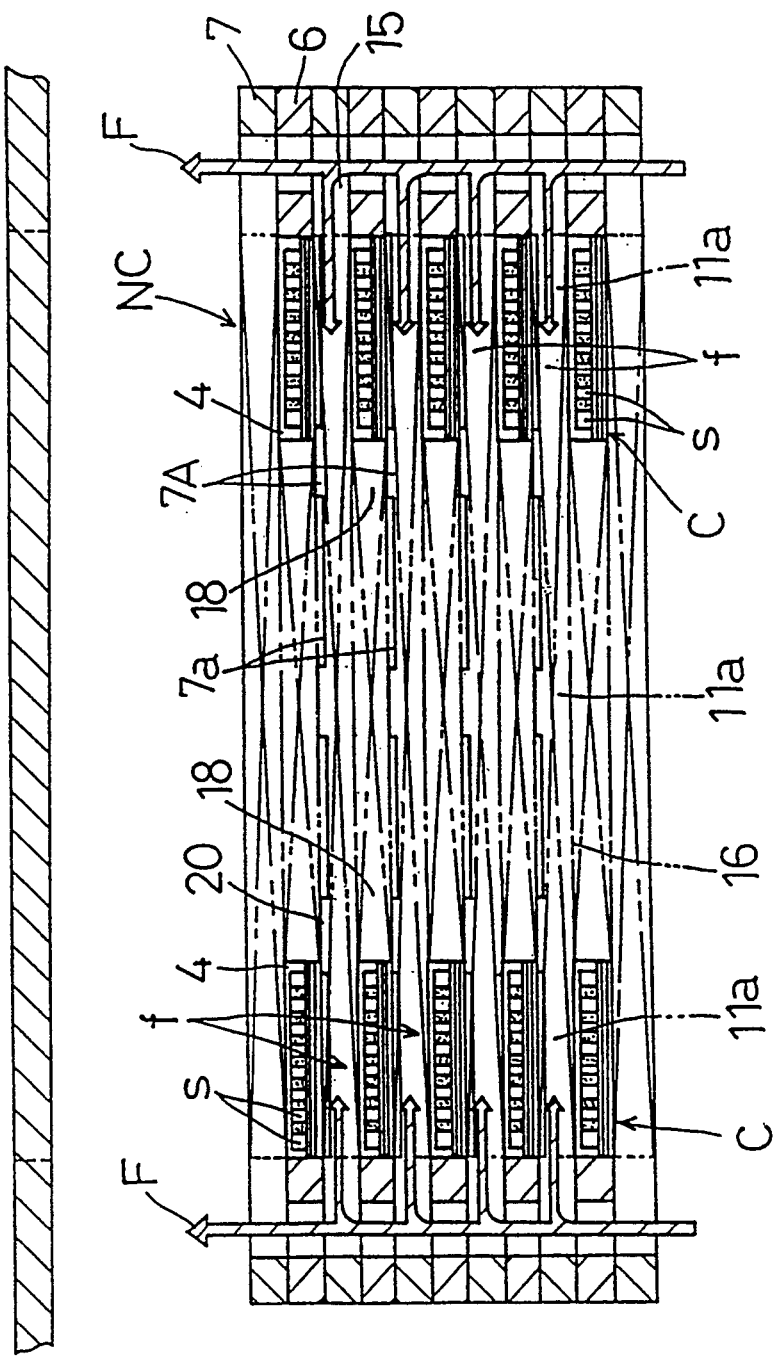
FIG. 13 is a sectional front view of the solid-electrolyte fuel cell system shown in FIG. 10.
Figure 14:
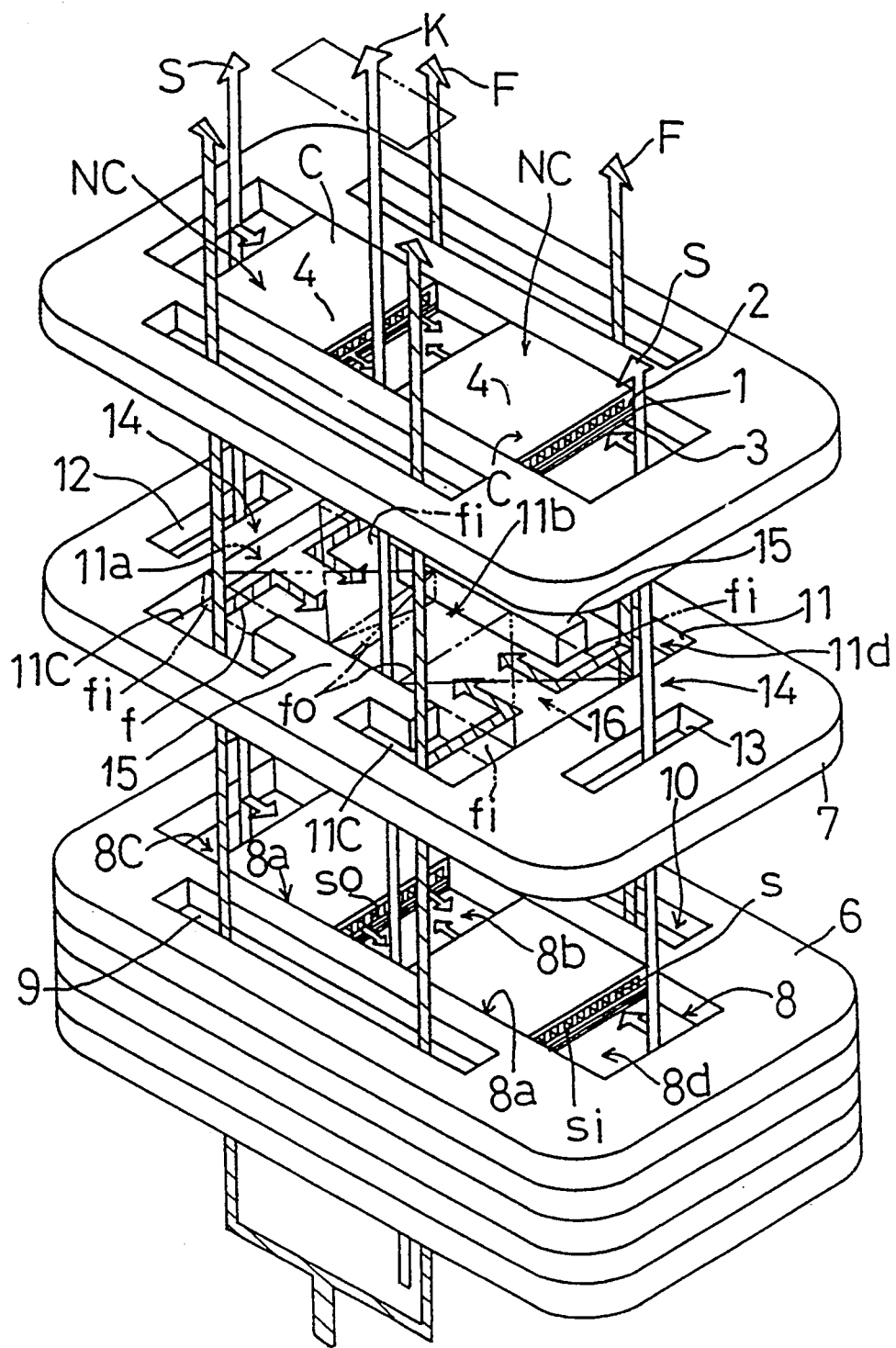
FIG. 14 is an exploded perspective view of a solid-electrolyte fuel cell system in a still further embodiment of the invention.
Figure 15:
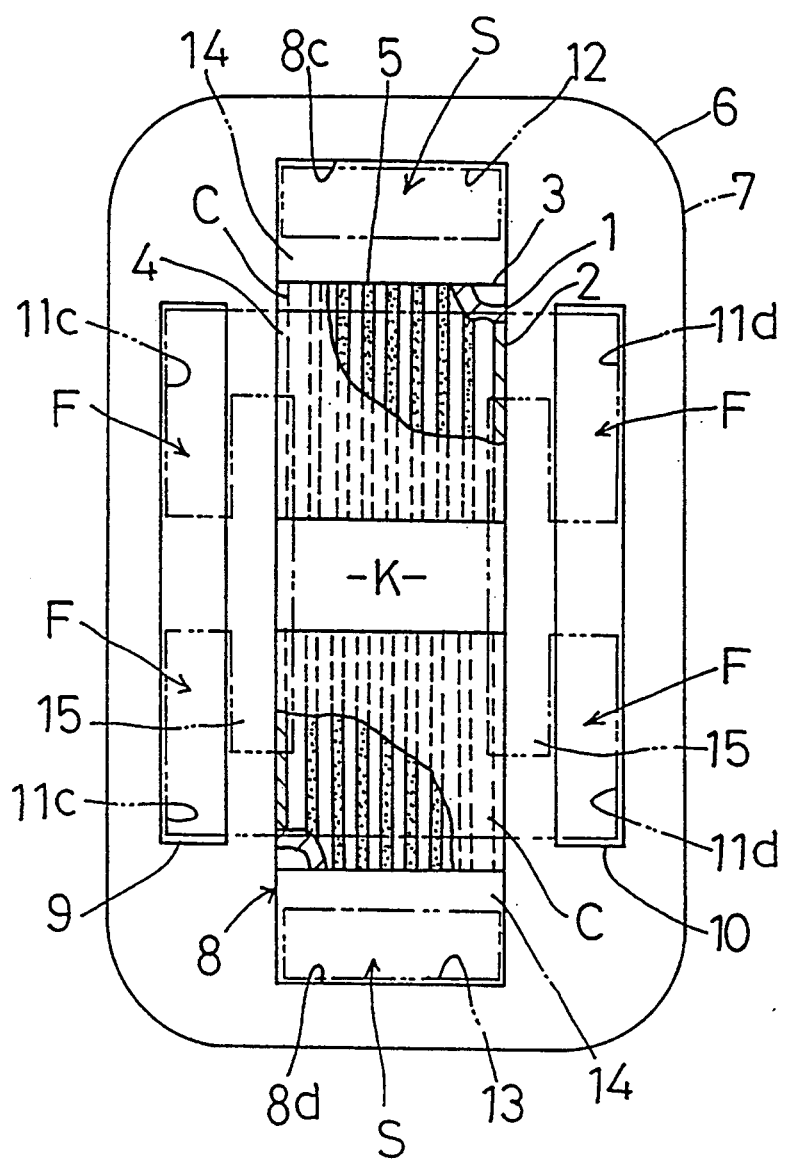
FIG. 15 is a sectional plan view of the solid-electrolyte fuel cell system shown in FIG. 14.
Figure 16:
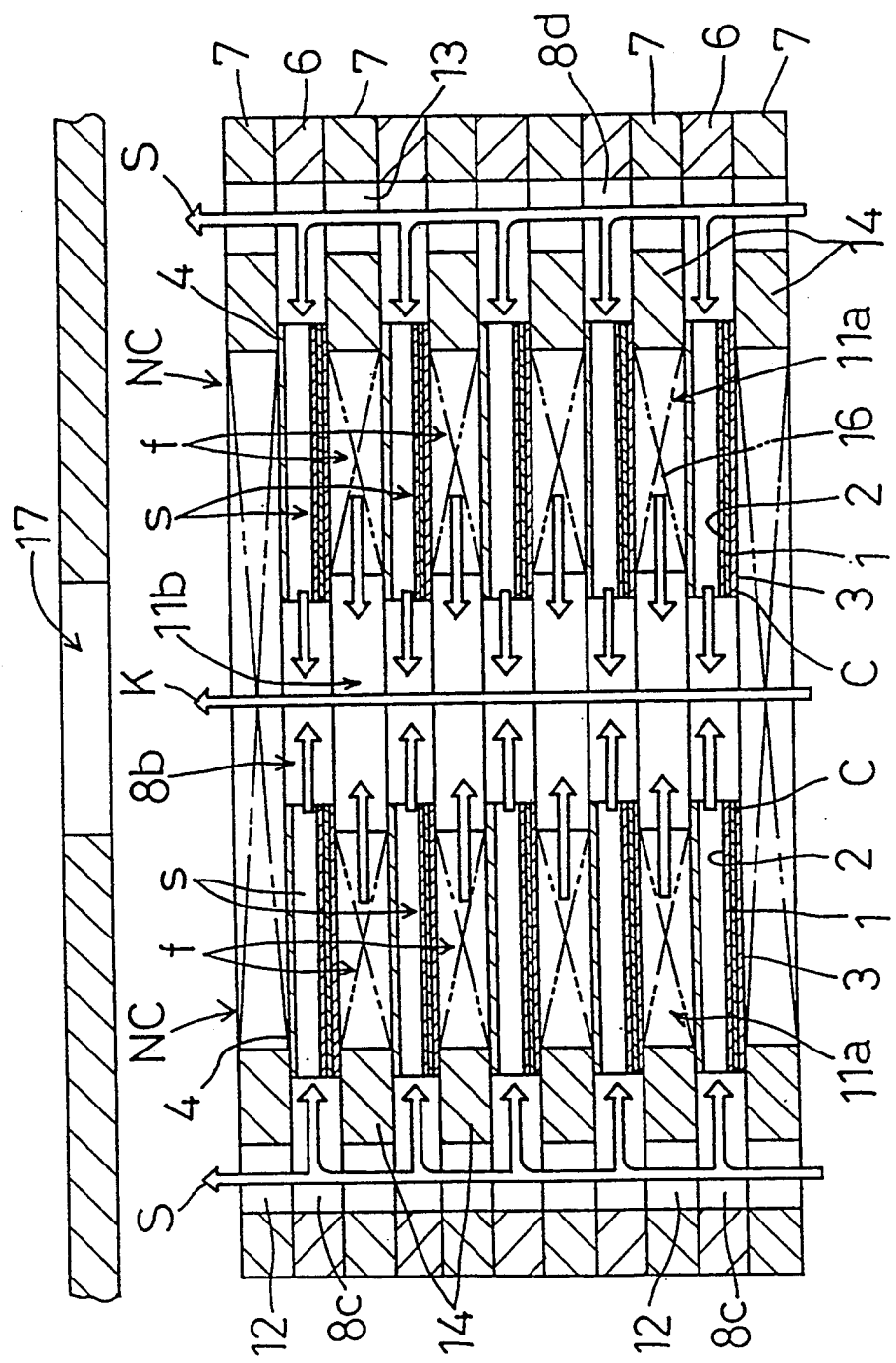
FIG. 16 is a sectional side view of the solid-electrolyte fuel cell system shown in FIG. 14.
Figure 17:
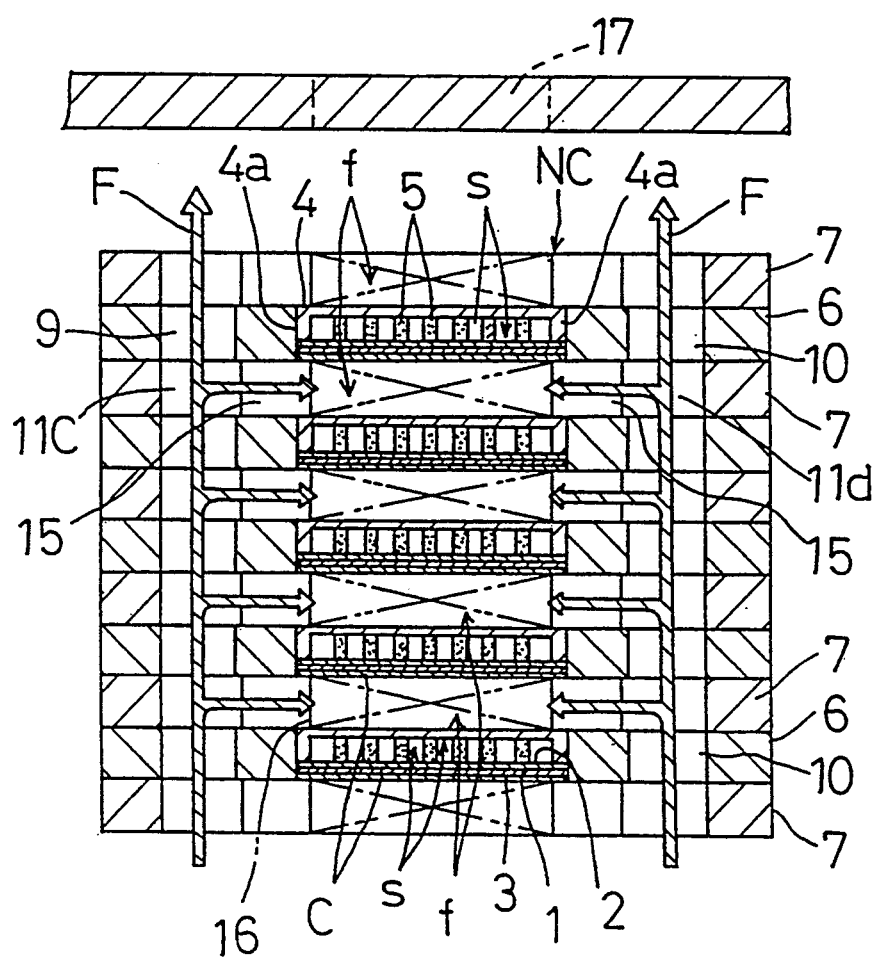
FIG. 17 is a sectional front view of the solid-electrolyte fuel cell system shown in FIG. 14.
Figure 18:
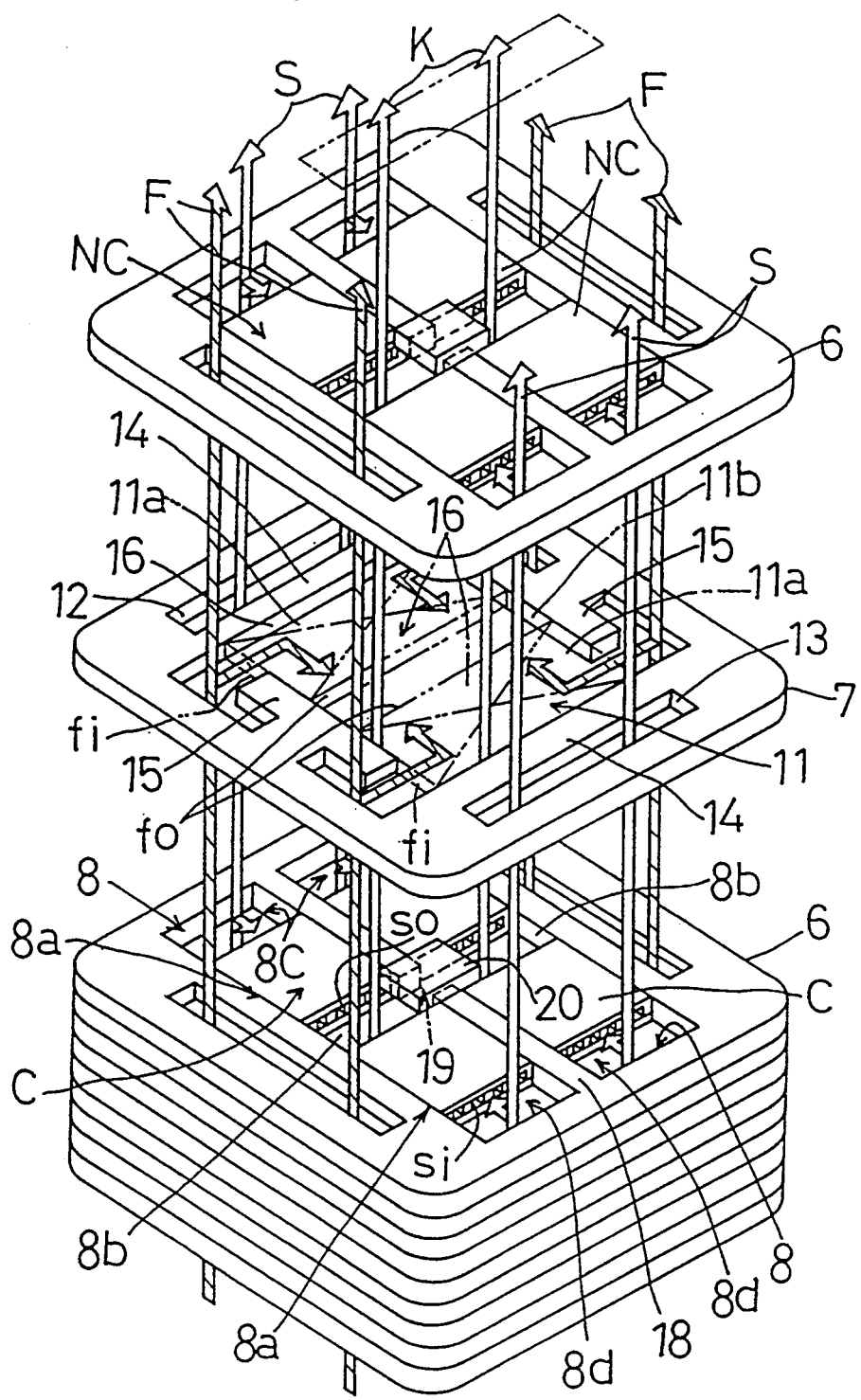
FIG. 18 is an exploded perspective view of a solid-electrolyte fuel cell system in yet another embodiment of the invention.
Figure 19:
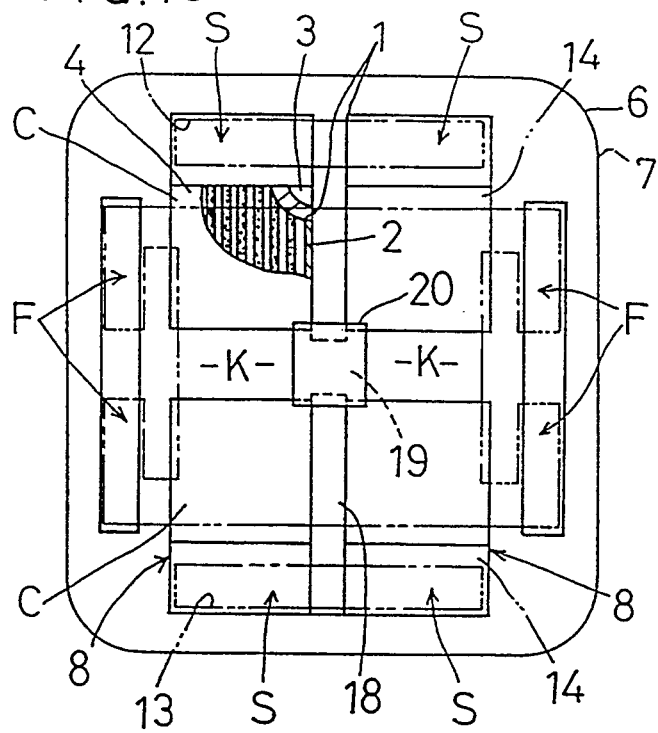
FIG. 19 is a sectional plan view of the solid-electrolyte fuel cell system shown in FIG. 18.
Figure 20:
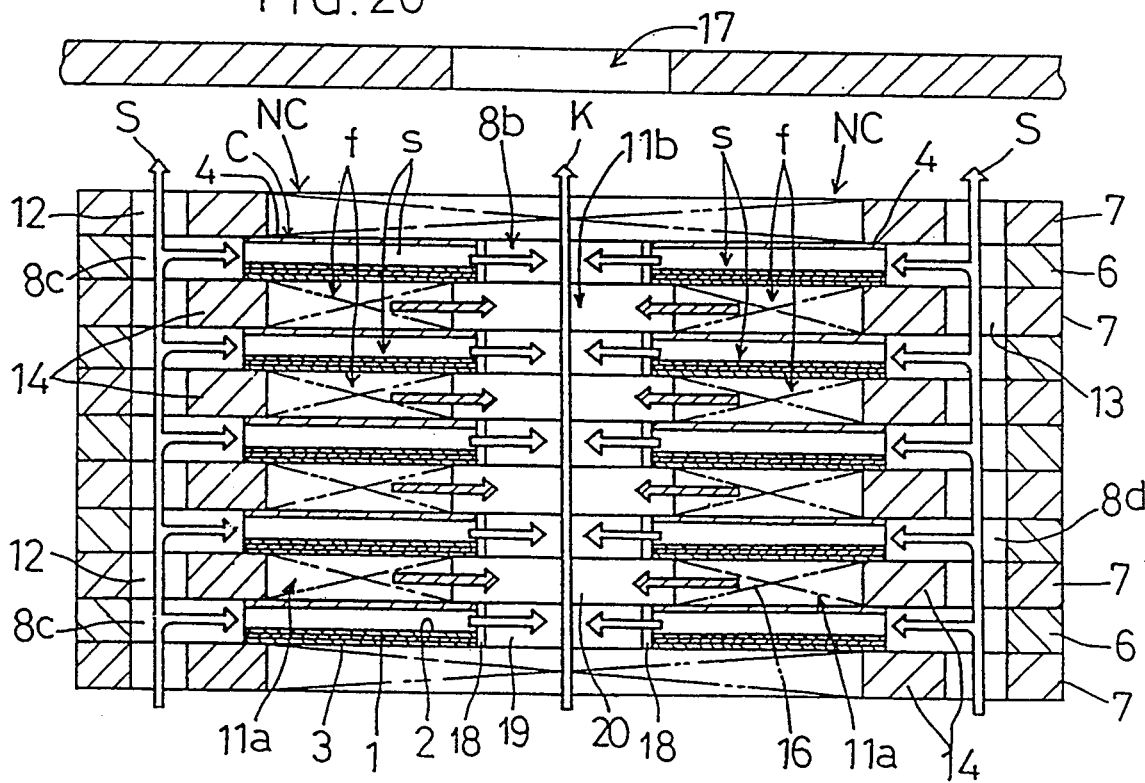
FIG. 20 is a sectional side view of the solid-electrolyte fuel cell system shown in FIG. 18.
Figure 21:
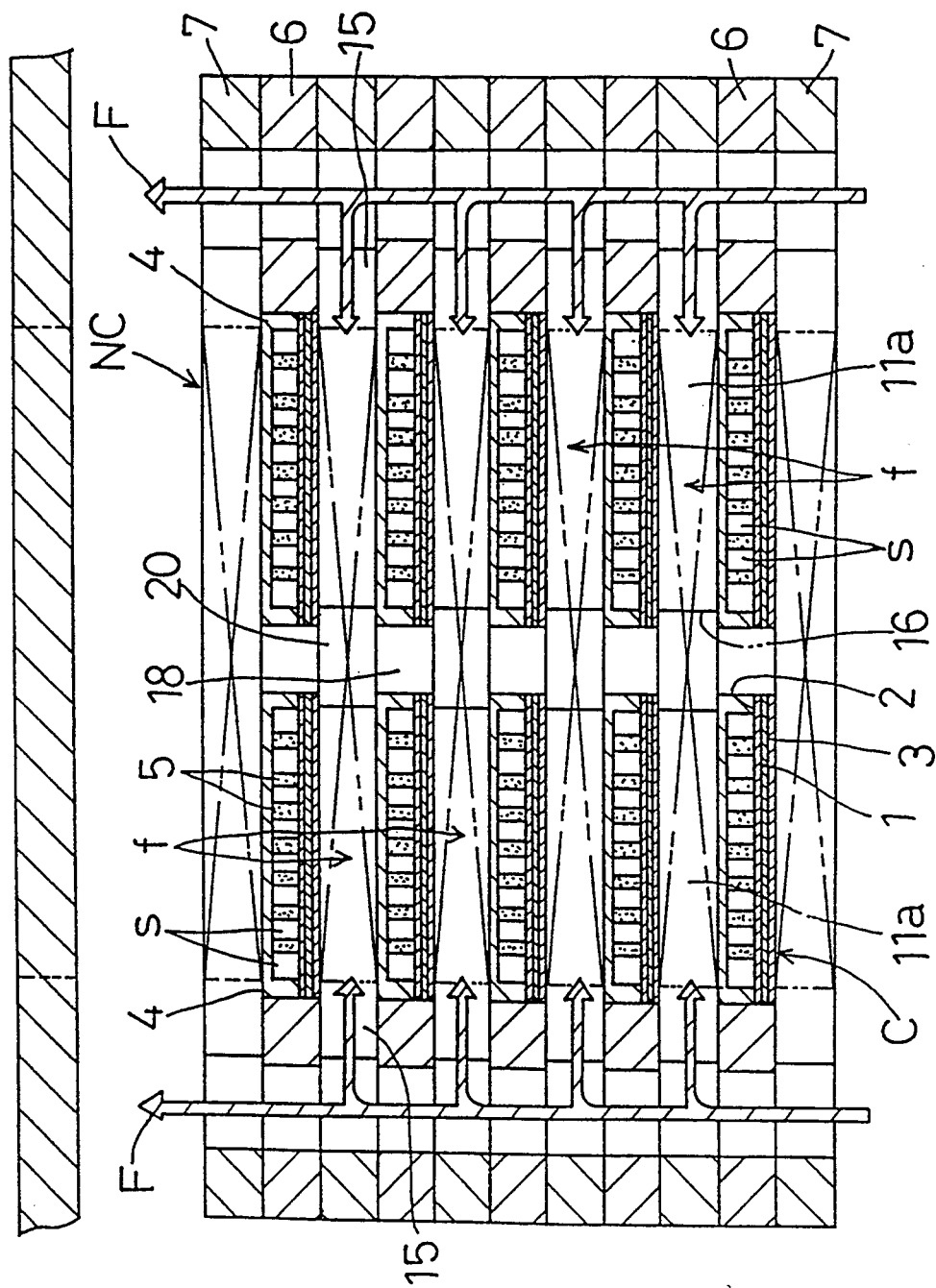
FIG. 21 is a sectional front view of the solid-electrolyte fuel cell system shown in FIG. 18.
Figure 22:
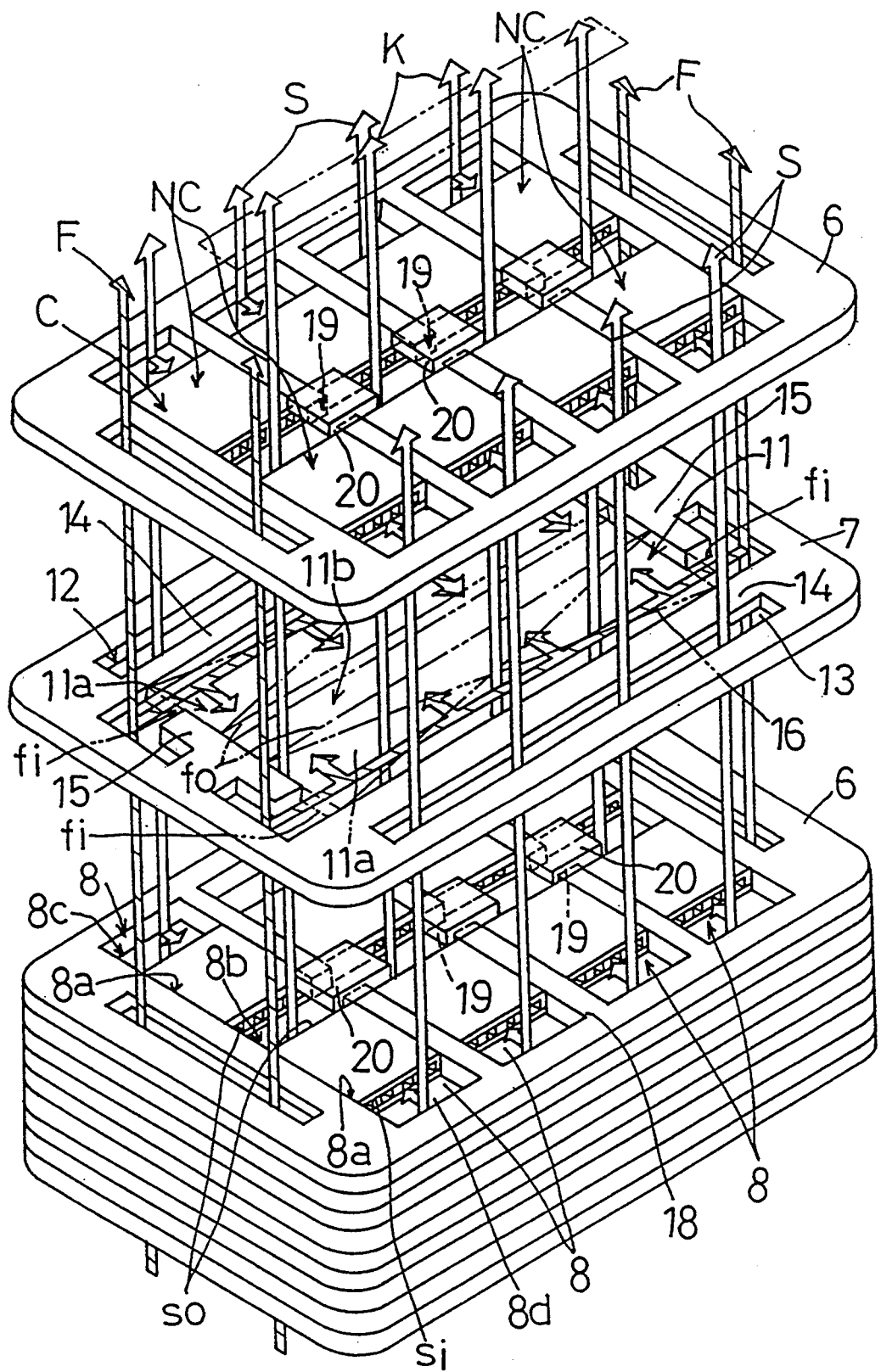
FIG. 22 is an exploded perspective view of a solid-electrolyte fuel cell system in a yet another embodiment of the invention.
Figure 23:
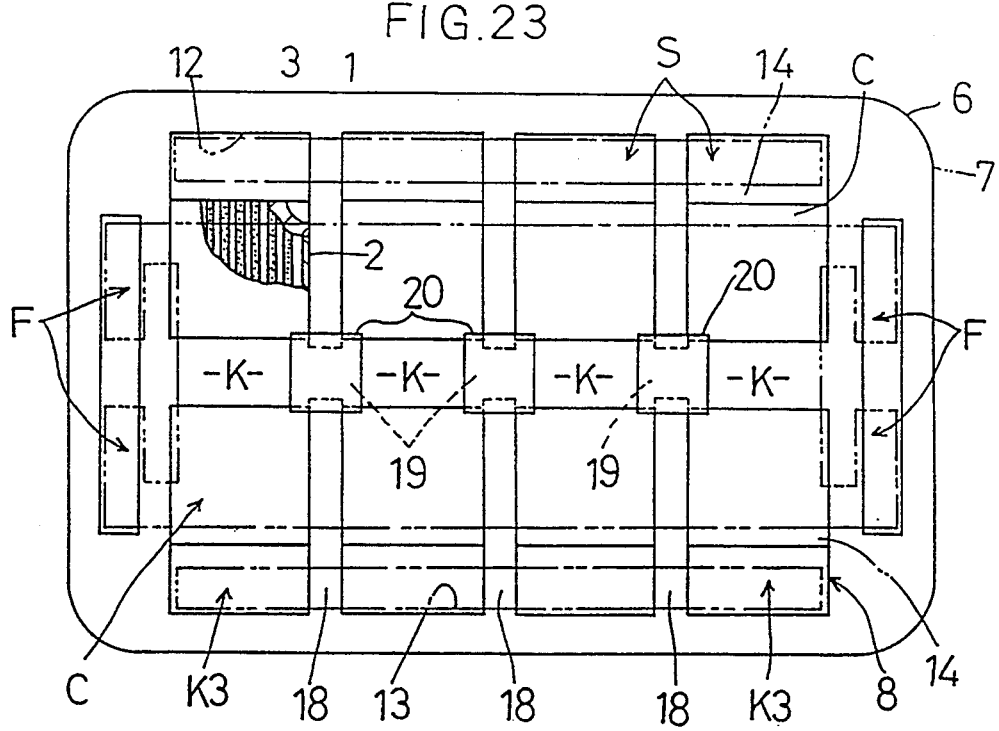
FIG. 23 is a sectional plan view of the solid-electrolyte fuel cell system shown in FIG. 22.
Figure 24:
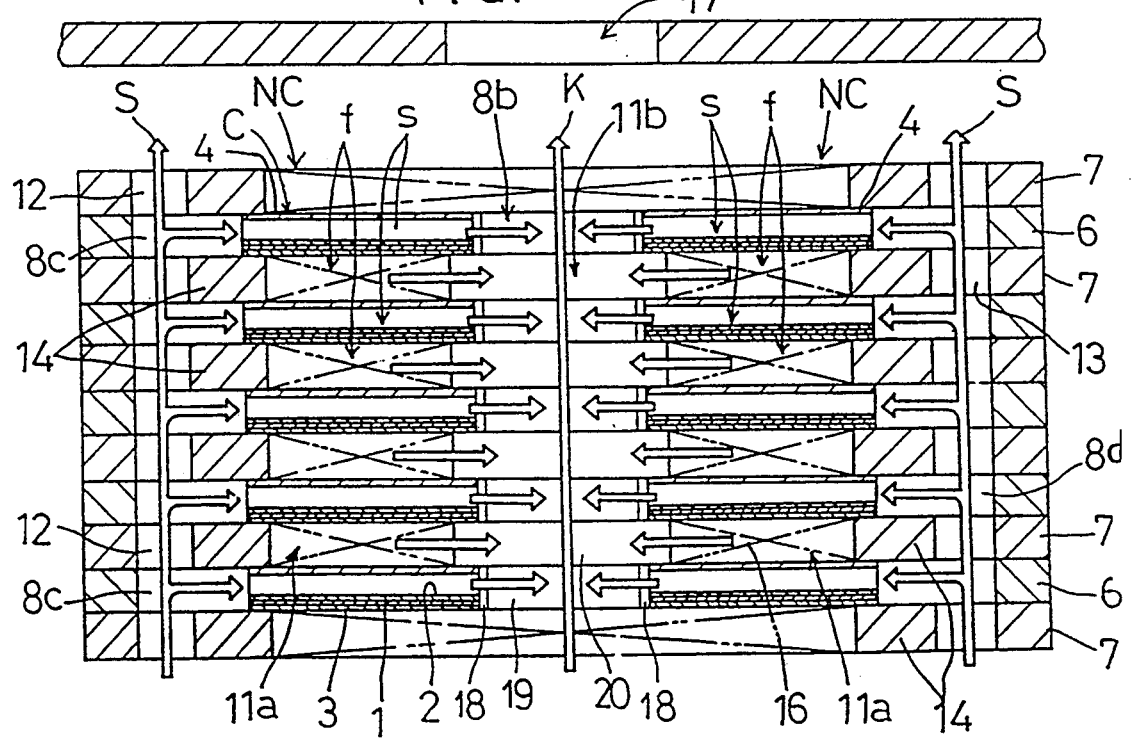
FIG. 24 is a sectional side view of the solid-electrolyte fuel cell system shown in FIG. 22.
Figure 25:
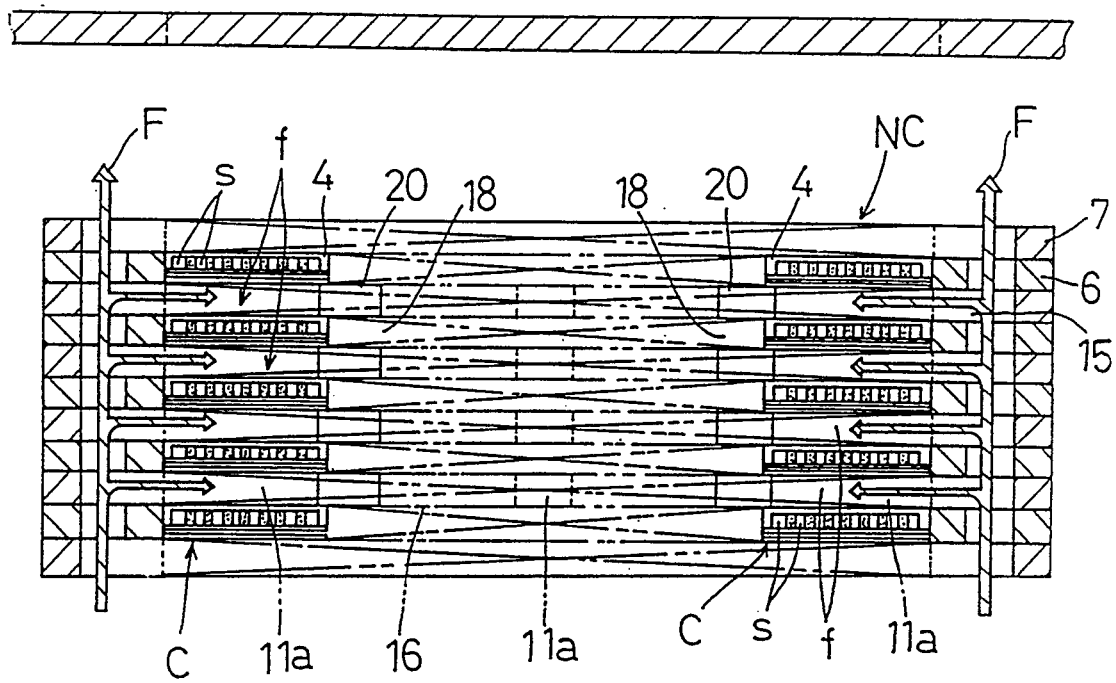
FIG. 25 is a sectional front view of the solid-electrolyte fuel cell system shown in FIG. 22.

This embodiment has first plates 6 identical in construction to the first plates shown in FIG. 6. In the embodiment shown in FIGS. 6 through 9, each of the second plates 7 includes two thin wall sections 7A each having a recessed upper surface 7a for intercommunicating one of the passage defining regions 11a and the fourth blank region 11b. This embodiment does not provide thin wall sections 7A. Each of second plates 7 in this embodiment includes an intercellular passage defining opening 11. This opening 11 has two passage defining regions 11a, and a fourth blank region 11b between the passage defining regions 11a. The fourth blank region 11b is in phase with the first blank regions 8b of the first plates 6. Each passage defining region 11a has a fifth blank region 11c and a sixth blank region 11d disposed at opposite sides thereof. The fifth blank region 11c communicates with the first communicating openings 9 of the first plates 6, while the sixth blank region 11d communicates with the second communicating openings 10 of the first plates 6.

In each cell assembly NC, the inlet defining elements 15 are disposed at the opposite sides of adjacent cells C arranged in the stacking direction. These inlet defining elements 15 support the adjacent cells C in a spaced relationship.

A still further embodiment will be described with reference to FIGS. 18 through 21.

Each of first plates 6 in this embodiment includes two cell receiving openings 8 spaced apart by a partition wall 18. The partition wall 18 includes a communicating section 19 for intercommunicating first blank regions 8b of the cell receiving openings 8.

Each of second plates 7 includes an intercellular passage defining opening 11. This opening 11 has passage defining regions 11a each shared by the cell receiving openings 8 in the first plates 6, and a fourth blank region 11b opposed to and shared by the first blank regions 8b in the first plates 6. Each of the second plates 7 also includes a third communicating opening 12 and a fourth communicating opening 13. The third communicating opening 12 communicates with second blank regions 8c of the cell receiving openings 8 in the first plates 6, while the fourth communicating opening 13 communicates with third blank regions 8d of the cell receiving openings 8 in the first plates 6.

In each of the second plates 7, one of the passage defining regions 11a of the intercellular passage defining opening 11 is separated from the third communicating opening 12. The other passage defining region 11a is separated from the fourth communicating opening 13. Seal elements 14 are formed to provide a gastight condition between one of the passage defining regions 11a of the second plate 7 and the second blank region 8c of each cell receiving opening 8 in each of the first plates 7, and between the other passage defining region 11a of the second plate 7 and the third blank region 8d of each cell receiving opening 8 in each of the first plates 7.

A spacer 20 is mounted on an upper surface defining the communicating section 19 of the partition wall 18 of each of the first plates 6.

The first plates 6 and second plates 7 are stacked alternately and in a predetermined relative phase to form four cell assemblies NC. Each of the first plates 6 accommodates two rows of cells C therein, with outlets "so" and "fo" of one row opposed to those of the other row. Each of the second plates 7 has a fuel-side flexible conductive material 16 filled into each passage defining region 11a of the intercellular passage defining opening 11.

In each cell assembly NC, the spacer 20 is disposed on opposed corners of adjacent cells C arranged in the stacking direction. The spacer 20 supports the adjacent cells C in a spaced relationship.

The passage defining regions 11a of the intercellular passage defining openings 11 in each of the second plates 7 define the fuel gas passages "f" of the cells C arranged in rows. The positions of the fuel gas passages "f" corresponding to the constricted passages formed by the inlet defining elements 15 adjacent the oxygen-containing gas inlet "si" of the cell C define the fuel gas inlets "fi". The positions of the fuel gas passages "f" opposed to the fourth blank region 11b define the fuel gas outlet "fo".

That is, an oxygen-containing gas supply passage S is formed at one side of each cell assembly NC, as seen in the stacking direction of the cell assembly NC, to communicate with the oxygen-containing gas passages "s". Fuel gas supply passages F are formed at opposite sides of each row of cell assemblies NC adjacent the oxygen-containing gas supply passage S to communicate with the fuel gas passages "f". A combustion chamber K is formed at the side of each cell assembly NC opposite from the oxygen-containing gas supply passage S to communicate with the oxygen-containing gas passages "s" and fuel gas passages "f".

The four cell assemblies NC are arranged in two rows, and the combustion chambers K are disposed between and shared by the two rows of cell assemblies NC.

In the solid-electrolyte fuel cell system having the above construction, the oxygen-containing gas is supplied from the oxygen-containing gas supply passages S to flow straight through the oxygen-containing gas passages "s" and directly into the combustion chambers K. The fuel gas is supplied from the fuel gas supply passages F to opposite sides of the fuel gas passages "f" to flow through the curved fuel gas passages "f" and directly into the combustion chambers K. The exhausted oxygen-containing gas and fuel gas are burned in the combustion chambers K.

A still further embodiment will be described with reference to FIGS. 22 through 25.

This embodiment has first plates 6 identical in construction to the first plates of the embodiment shown in FIGS. 10 through 13. In the embodiment shown in FIGS. 10 through 13, each of the second plates 7 includes two thin wall sections 7A each having a recessed upper surface 7a for intercommunicating one of the passage defining regions 11a and the fourth blank region 11b. This embodiment does not provide thin wall sections 7A. Each of second plates 7 in this embodiment includes an intercellular passage defining opening 11. This opening 11 has passage defining regions 11a shared by the cell receiving regions 8a of each cell receiving opening 8 in the first plates 6. Further, the opening 11 includes a fourth blank region 11b in phase with the first blank regions 8b of the first plates 6.

A spacer 20 is mounted on an upper surface defining the communicating section 19 of each partition wall 18 of each of the first plates 6.

In each cell assembly NC, the spacer 20 is disposed on opposed corners of adjacent cells C arranged in the stacking direction. The spacer 20 supports the adjacent cells C in a spaced relationship.

Other embodiments will be listed hereinafter.

(1) In the embodiment shown in FIGS. 1 through 5, the fuel gas supply inlets "fi" are formed on the opposite sides adjacent the oxygen-containing gas inlets "si" of the cells C, and the fuel gas supply passages F are formed at the opposite sides of the cell assembly NC adjacent the oxygen-containing gas supply passage S. Instead of this arrangement, the fuel gas supply inlets "fi" may be formed on one side adjacent the oxygen-containing gas inlets "si" of the cells C, with one fuel gas supply passage F formed at the same side of the cell assembly NC adjacent the oxygen-containing gas supply passage S. In this case, one of the inlet defining elements 15 of each of the second plates 7 is formed continuous with the seal element 14 to eliminate the constricted passage 14. The fifth blank region 11c or sixth blank region 11d adjacent this inlet defining element 15 is eliminated. Each of the first plates 6 includes no first communicating opening 9 or second communicating opening 10 communicating with the blank region 11c or 11d eliminated.

(2) In the embodiment shown in FIGS. 1 through 5, the inlet defining elements 15 define the fuel gas inlets "fi" adjacent the oxygen-containing gas inlet "si". Instead of providing the inlet defining elements 15, the fuel gas inlets "fi" may be formed over the entire lengths of the sides adjacent the oxygen-containing gas inlet "si" of each cell C.

Figure 26:
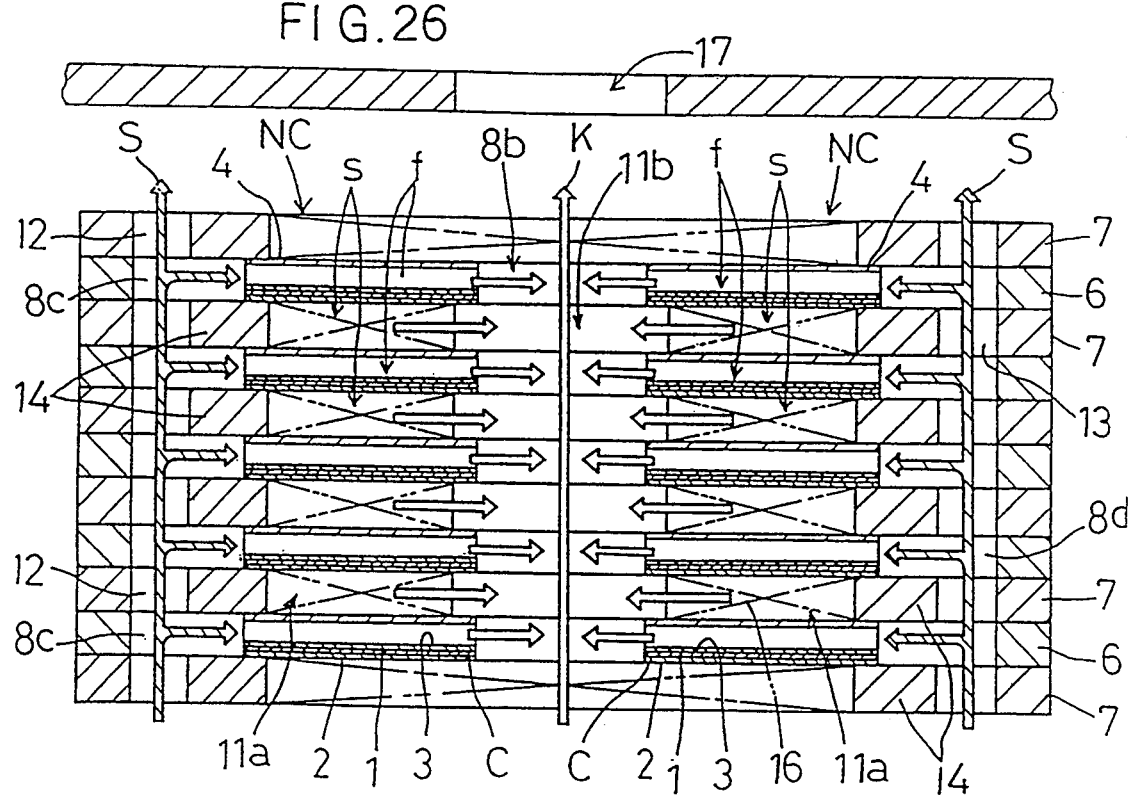
FIG. 26 is a sectional side view of a solid-electrolyte fuel cell system in a still further embodiment of the invention.
Figure 27:
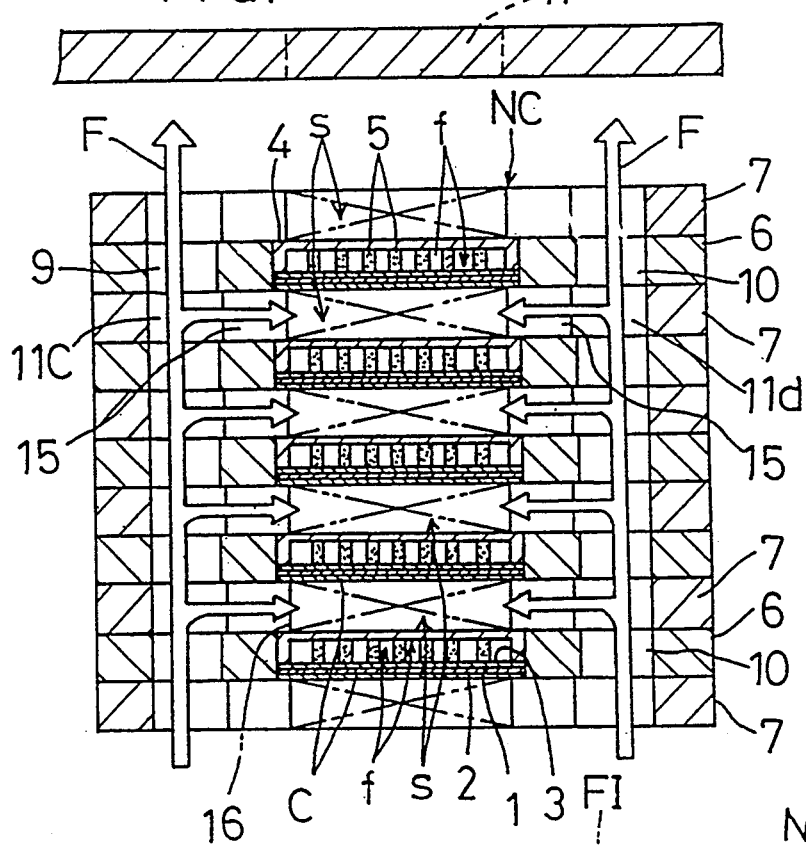
FIG. 27 is a sectional front view of the solid-electrolyte fuel cell system shown in FIG. 26.
Figure 28:
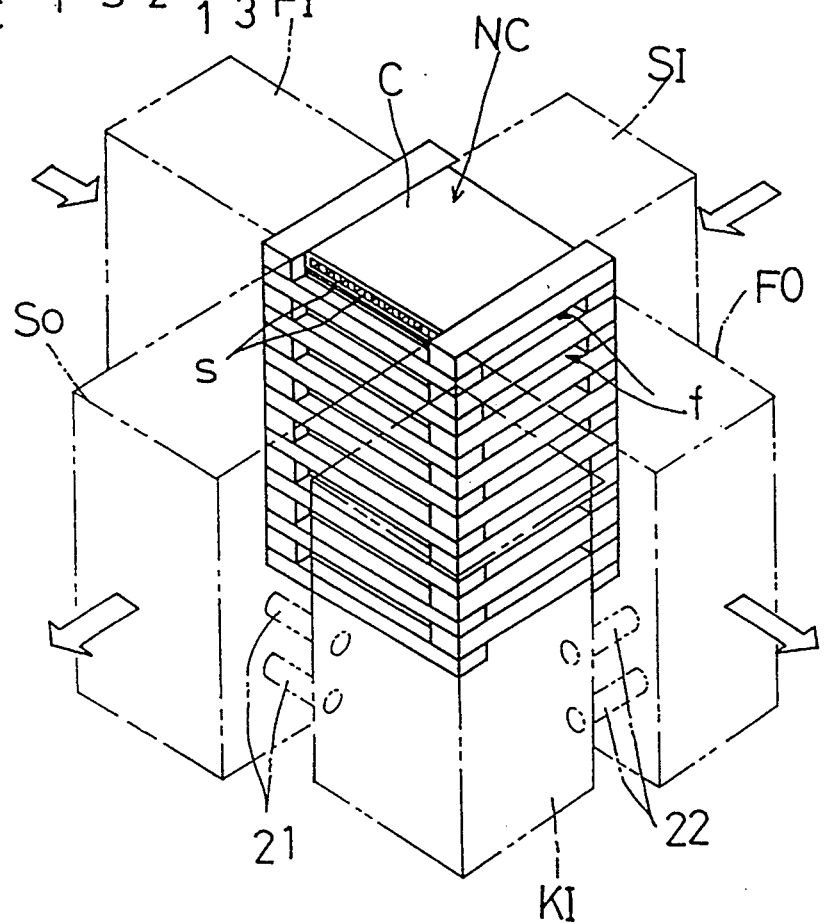
FIG. 28 is a perspective view of a conventional solid-electrolyte fuel cell system.

(3) In the embodiment shown in FIGS. 6 through 9, the separator 4 is attached to the oxygen electrode 2 of each cell C to define the oxygen-containing gas passage "s" therebetween. As shown in FIGS. 26 and 27, the separator 4 may be attached to the fuel electrode 3 to define a fuel passage "f" therebetween.

With the first plates 6 and second plates 7 stacked alternately, the passage defining regions 11a of the intercellular passage defining opening 11 in each of the second plates define the oxygen-containing gas passage "s". The second blank regions 8c of the cell receiving openings 8 in the first plates 6 and the third communicating openings 12 in the second plates 7 define a second space S extending in the stacking direction. The third blank regions 8d of the cell receiving openings 8 in the first plates 6 and the fourth communicating openings 13 in the second plates 7 define another second space S extending in the stacking direction. These second spaces S define fuel gas supply passages. The first communicating openings 9 in the first plates 6 and the fifth blank regions 11c of the intercellular passage defining openings 11 in the second plates 7 define a third space F extending in the stacking direction. The second communicating openings 10 in the first plates 6 and the sixth blank regions 11d of the intercellular passage defining openings 11 in the second plates 7 define another third space F extending in the stacking direction. These third spaces F define oxygen-containing gas supply passages.

(4) Each cell C in the foregoing embodiments has a planar, rectangular shape. This shape is not limitative, but each cell C may have a circular, elliptic or other shape.

What is claimed is:

1. A solid-electrolyte fuel cell system comprising:
a plurality of fuel cells each having;
an electrolyte layer,
an oxygen electrode applied to one surface of said electrolyte layer, a fuel electrode applied to the other surface of said electrolyte layer, passage defining means opposed to said oxygen electrode, an oxygen-containing gas passage defined between said oxygen electrode and said passage defining means, one end of said oxygen-containing gas passage being an oxygen-containing gas inlet and the other end of said oxygen-containing gas passage being an oxygen-containing gas outlet, said fuel cells being stacked to form a cell assembly;

a fuel gas passage defined between each adjacently stacked pair of the fuel cells, said fuel gas passage having a fuel gas inlet opened in a direction different from said oxygen-containing gas inlet as seen in a stacking direction of said cell assembly and having a fuel gas outlet opened in the same direction as said oxygen-containing gas outlet as seen in the stacking direction of said cell assembly;

inlet defining means provided at each said fuel gas inlet for restricting said fuel gas inlet toward said oxygen-containing gas inlet as seen in the stacking direction of said cell assembly, so that fuel gas supplied through said fuel gas inlet is guided along a non-straight path toward said fuel gas outlet;

oxygen-containing gas supply passage means provided at each said oxygen-containing gas inlet to communicate with the outside of said cell assembly;

fuel gas supply passage means provided at each said fuel gas inlet to communicate with the outside of said cell assembly; and a combustion chamber disposed outside said cell assembly and communicating with said oxygen-containing gas outlet and said fuel gas outlet to burn an oxygen-containing gas exhausted from said oxygen-containing gas outlet passage and a fuel gas exhausted from said fuel gas outlet.

2. A solid-electrolyte fuel cell system as defined in claim 1, further comprising a second cell assembly sharing said combustion chamber with said cell assembly.

3. A solid-electrolyte fuel cell system as defined in claim 1, wherein said fuel gas inlet is formed at each of opposed sides of said oxygen-containing gas inlet, as seen in the stacking direction of said cell assembly and said fuel gas supply passage means is provided for each said fuel gas inlet to communicate with the outside of said cell assembly.

4. A solid-electrolyte fuel cell system as defined in claim 3, further comprising a second cell assembly sharing said combustion chamber with said cell assembly.

5. A solid-electrolyte fuel cell system as defined in claim 1, further comprising a second cell assembly, said cell assembly and said second cell assembly being arranged in rows, with an opposed pair of cells in the respective rows having the oxygen-containing gas outlets and fuel gas outlets opposed to each other.

6. A solid-electrolyte fuel cell system as defined in claim 5, wherein said fuel gas inlet is formed at each of opposed sides of said oxygen-containing gas inlet, as seen in the stacking direction of said cell assembly and said fuel gas supply passage means is provided for each said fuel gas inlet to communicate with the outside of said cell assembly.

7. A solid-electrolyte fuel cell system comprising:

a plurality of fuel cells each having;

an electrolyte layer, an oxygen electrode applied to one surface of said electrolyte layer, a fuel electrode applied to the other surface of said electrolyte layer, passage defining means opposed to said fuel electrode, a fuel gas passage defined between said fuel electrode and said passage defining means, one end of said fuel gas passage being a fuel gas inlet and the other end of said fuel gas passage being a fuel gas outlet, said fuel cells being stacked to form a cell assembly;

an oxygen-containing gas passage defined between each adjacently stacked pair of the fuel cells, said oxygen-containing gas passage having an oxygen-containing gas inlet opened in a direction different from said fuel gas inlet as seen in a stacking direction of said cell assembly and having an oxygen-containing gas outlet opened in the same direction as said fuel gas outlet as seen in the stacking direction of said cell assembly;

inlet defining means provided at each said oxygen-containing gas inlet for restricting said oxygen-containing gas inlet toward said fuel gas inlet as seen in the stacking direction of said cell assembly, so that an oxygen-containing gas supplied through said oxygen-containing gas inlet is guided along a non-straight path toward said oxygen-containing gas outlet;

oxygen-containing gas supply passage means provided at each said oxygen-containing gas inlet to communicate with the outside of said cell assembly;

fuel gas supply passage means provided at each said fuel gas inlet to communicate with the outside of said cell assembly; and a combustion chamber disposed outside said cell assembly and communicating with said oxygen-containing gas outlet and said fuel gas outlet to burn an oxygen-containing gas exhausted from said oxygen-containing gas outlet passage and a fuel gas exhausted from said fuel gas outlet.

* * * * *

UNITED STATES PATENT AND TRADEMARK OFFICE
CERTIFICATE OF CORRECTION

PATENT NO. : 5,350,642
DATED : September 27, 1994
INVENTOR(S) : Kosuke Akagi

It is certified that error appears in the above-indentified patent and that said Letters Patent is hereby corrected as shown below:

```
Column 1, line 15, after "assembly" insert --;--.
Column 1, line 24, "as" should be --gas--.
Column 3, line 2, after "fuel" insert --gas--.
Column 9, line 14, after "plate" insert --7--.
Column 10, line 51, after "8b" insert --of--.
Column 14, line 40, after "plates" insert --7--.
```

Signed and Sealed this

Twenty-fifth Day of April, 1995

Attest:

BRUCE LEHMAN

*Attesting Officer*     *Commissioner of Patents and Trademarks*